United States Patent [19]

Thompson et al.

[11] Patent Number: 4,729,105
[45] Date of Patent: Mar. 1, 1988

[54] CONTINUOUS PROCESSING SYSTEM WITH ACCUMULATOR MODEL FOR PRODUCT FLOW CONTROL

[75] Inventors: Roger A. Thompson, Littleton; Phillip W. Gold, Arvada, both of Colo.

[73] Assignee: Adolph Coors Company, Golden, Colo.

[21] Appl. No.: 831,416

[22] Filed: Feb. 20, 1986

[51] Int. Cl.[4] .................... G06F 15/00; G09B 25/00
[52] U.S. Cl. ................................ 364/478; 364/149
[58] Field of Search ........................... 364/148–166, 364/478, 468

[56] References Cited

U.S. PATENT DOCUMENTS

| | | | |
|---|---|---|---|
| 4,512,747 | 4/1985 | Hitchens et al. | 364/478 |
| 4,604,718 | 8/1986 | Norman et al. | 364/478 |
| 4,682,280 | 7/1987 | Schneider | 364/478 |

Primary Examiner—Jerry Smith
Assistant Examiner—Allen MacDonald
Attorney, Agent, or Firm—Klaas & Law

[57] ABSTRACT

A continuous processing system for performing production operations on a plurality of unit products using at least two discrete processing machines including: an upstream processing machine; a downstream processing machine; an accumulator for transferring unit products between the upstream machine and the downstream machine and for accumulating unit products in tightly packed continuously touching relationship in a variable length area starting at a position adjacent the downstream machine and extending toward the upstream machine, the number of unit products in the tightly packed continuously touching relationship defining a continuous-fill-accumulation; a count-in sensor for sensing each unit product entering the accumulator; a count-out sensor for sensing each unit product exiting from the accumulator; a computer software accumulator model for operating on data derived from the sensor signals and from physical characteristics of the accumulator for continuously predicting the continuous-fill-accmulation; and machine speed control apparatus for continuously variably controlling the speed of the upstream machine and/or the downstream machine based on the predicted continuous-fill-accumulation.

24 Claims, 6 Drawing Figures

Fig-4

NONREGION PROTECTED ACCUMULATOR PECULIAR CONSTANT VALUES

| |
|---|
| MAXIMUM TIGHTLY PACKED PRODUCT ACCUMULATION BETWEEN HIGH AND LOW LEVEL SENSORS (56,58) (MAX $ FILL) 107 |
| TOTAL ELAPSED TIME FOR PRODUCT TO MOVE UNOBSTRUCTED FROM HIGH LEVEL SENSOR (56) TO LOW LEVEL SENSOR (58) (TRANSIT $ TIME) 108 |
| UPDATE INTERVAL FOR SHIFTING DATA THROUGH DATA ARRAY (106) AND TRANSFER OF DATA TO CFA DATA ELEMENT (102)(UPDATE $ INTERVAL) 109 |
| PHYSICAL LENGTH OF ACCUMULATOR TO BE MODELED(ACCUMULATOR $LENGTH) 115 |
| RESOLUTION IN PULSES PER UNIT LENGTH OF THE ACCUMULATOR SPEED SENSING DEVICE(49) (PULSES $ PER $ UNITS $ LENGTH) 116 |

— FREE FALL OR CONSTANT VELOCITY ACCUMULATOR ONLY (points to 108)

— VARIABLE SPEED ACCUMULATOR ONLY (points to 116)

Fig-5

NONREGION PROTECTED ACCUMULATOR PECULIAR VARIABLE VALUES

| |
|---|
| NUMBER OF ELEMENTS IN THE DATA ARRAY (101) TO HAVE DATA THEREIN TRANSFERRED TO CFA VARIABLE DATA ELEMENT (102) (NUMBER $ ELEMENTS $ TRANSFER) 111 |
| STATUS OF ACCUMULATOR HIGH LEVEL SENSOR (56) ON PREVIOUS ITERATION OF MODEL UPDATE (105) (OLD $ ACCUMULATOR $LEVEL $HIGH) 119 |
| STATUS OF ACCUMULATOR LOW LEVEL SENSOR (58) ON A PREVIOUS ITERATION OF MODEL UPDATE(105) (OLD $ ACCUMULATOR $LEVEL $LOW) 120 |
| STATUS OF ACCUMULATOR HIGH LEVEL SENSOR (56) ON A CURRENT ITERATION OF MODEL UPDATE(105)(ACCUMULATOR $LEVEL $ HIGH) 121 |
| STATUS OF ACCUMULATOR LOW LEVEL SENSOR (58) ON A PREVIOUS ITERATION OF MODEL UPDATE(105) (ACCUMULATOR $LEVEL $LOW) 122 |

CONTINUOUS PROCESSING SYSTEM WITH ACCUMULATOR MODEL FOR PRODUCT FLOW CONTROL

APPENDIX

The attached appendix comprises a program listing and description of the software of the present invention which is incorporated herein by reference and forms a part of this disclosure for all that it teaches. This program was run in the INTEL:RMS 86 operating system which is commercially available from the Intel Corporation of 3200 Lakeside Drive, Santa Clara, Calif. 95051.

BACKGROUND OF THE INVENTION

The present invention is directed to a continuous processing system for performing high speed production operations on a plurality of unit products and, more particularly, to a continuous processing system using product accumulator inventory measurement for controlling processing machine speed in a loosely coupled mechanical system.

Loosely coupled mechanical systems are those in which discrete processing machines are coupled together to form a continuous process. The machines are generally coupled together by an accumulator connected between the machines. The accumulator provides a product flow path between the processing machines and also provides space for accumulating a product inventory between the machines.

An accumulator product "inventory" or "accumulation" as used herein refers to the number of unit products in the accumulator at any particular time and includes products flowing freely through the accumulator, hereinafter sometimes referred to as the "floating accumulation," as well as products positioned in relatively tightly paced relationship adjacent the downstream processing machine, hereinafter sometimes referred to as the "continuous accumulation" or "continuous-fill-accumulation." Many high speed processing machines require a continuous, i.e. uninterrupted, supply of unit products for proper operation. If there is a gap in the supply of unit products to such machines, incorrectly formed parts or faulty machine operation may occur. Thus when such machines are used in a loosely coupled mechanical system it is important to provide a continuous accumulation of relatively tightly packed unit products in a portion of an accumulator immediately upstream of such a processing machine to ensure that there will be a continuous supply of products to the machine. Monitoring or measurement of this continuous accumulation is necessary in high speed operations. A sufficiently large continuous accumulation must be maintained to provide sufficient time for the system to react, i.e. to provide enough time to enable the downstream machine to be slowed or stopped before the continuous accumulation is exhausted. For example, the downstream machine must be slowed or stopped if the flow of unit products into the accumulator upstream of the machine is slowed or stopped for an extended period. The monitoring or measurement of the continuous accumulation is also important to prevent too great a continuous inventory in the accumulator, i.e. an "overflow" condition. As overflow condition could cause damage to the upstream and downstream processing machines as well as to the products being processed.

Expressing this control situation metaphorically, the downstream machine needs to "know" if there is a sufficient continuous inventory to start processing or to increase processing speed, and the upstream machine needs to "know" if the accumulator is running out of area to store the unit products because of downstream stoppage or slow down. A problem in measuring product accumulation in an accumulator is caused by the fact that an accumulator has two areas with different product flow characteristics: a downstream area wherein the unit products are tightly packed, i.e. the continuous accumulation area, with product movement being dependent on downstream machine speed, and an upstream area where unit products are flowing freely through the accumulator unimpeded by downstream conditions, i.e. the floating accumulation area. The relative size of the floating accumulation area and the continuous accumulation area of an accumulator are generally constantly changing. An accumulator inventory monitoring system, to be effective, must be able to distinguish between free flowing products in the floating accumulation and tightly packed products in the continuous accumulation and must be able to quickly determine the number of unit products in the ever changing continuous accumulation.

One prior art inventory measuring system makes measurements of the continuous accumulation by placing sensors at discrete points in the accumulator and from the monitored continuous accumulation value determines the appropriate machine speed response. However, it take such sensors a relatively long period of time to distinguish between a unit product moving quickly (a product in the floating accumulation) and a unit product moving slowly or intermittently (a product in the continuous accumulation). Thus it takes such a system a relatively long time to update its "count" of the number of unit products in the continuous accumulation. As a result such a system has a slow reaction time and a very large accumulator is required for higher machine operating speeds because of the system's slow reaction time. An associated disadvantage of such a system is that no information is provided to the measuring system about the incoming unit product rate. The resolution of this type of system is limited by the number of sensors used and the response time of the sensors for differentiation between free flowing product conditions and tightly packed product conditions.

Another known inventory measuring method is counting the unit products entering the accumulator, counting the unit products leaving the accumulator and computing the number of products in the accumulator based on these counts. A disadvantage of this method is the necessary assumption that all unit products entering the accumulator are immediately available for processing. The count in/count out method does not account for accumulator delay, i.e. the time that it takes a unit product to move through the accumulator. Thus, although the total accumulator inventory may be calculated, the continuous accumulation cannot be determined by such a system. For machines that require a continuous supply of unit products such a system is of little value.

SUMMARY OF THE INVENTION

The method and apparatus of the present invention provides an intelligent control system that stores in computer memory certain information about the characteristics of a subject accumulator and which operates on update information provided by detection of unit products entering and exiting the accumulator. The control system keeps track of the unit products moving through the accumulator using a tracking approach and computes the number of unit products in the continuous accumulation at frequent intervals. A control algorithm is then used to control the upstream and/or downstream machine speed based on the computed number of unit products in the continuous accumulation.

A computer models the physical accumulator as a data memory array in the form of a shift register. The size of the array determines the modeling resolution. As unit products are detected entering the accumulator an element of the array which corresponds to a first portion of the physical accumulator is incremented (increased by one) for each unit product that enters. The measuring system moves the data corresponding to a number of unit products accumulated in the initial element of the data array to the next element of the data array at periodic intervals which correspond to the transit time of unit products through the physical accumulator. The data movement process is the same for all the elements of the array, i.e. at the same time data from the initial element is shifted to the next succeeding element the data from that element is shifted to the element next succeeding it, etc. The data shifting through the array simulates the physical movement of products through the accumulator. A time based data shifting method is used for accumulators that move products with constant velocity and may also be used with accumulators where the products free fall. In the free fall accumulator the average velocity may be used to compute the average data shifting rate. In powered accumulators such at flat conveyors where the unrestricted part movement through the accumulator is controlled by a variable speed driving mechanism, a slightly different approach is used for data shifting. A pulse generator may be mechanically connected to the conveyor or may be connected to the conveyor motor and is used to indicate to the system computer when data should be shifted through the data array so that the computer properly tracks the part movement through the physical accumulator.

After each shift of data through the data array all of the data values in a selected portion of the data array are summed and transferred to a separate data element which stores the computed continuous-fill-accumulation, i.e. the computed number of unit products in the continuous accumulation of the physical accumulator. The data array elements from which the data is transferred are then set to zero. The continuous-fill-accumulation value is then used by the computer in a conventional control algorithm to control the relative speed of the upstream and/or downstream machine. The selected elements of the data array having values summed and transferred to the continuous-fill-accumulation data element during any particular system iteration are selected based on the value of the continuous-fill-accumulation data element immediately preceding the information transfer thereto and includes a continuous string of data array elements beginning with the element of the data array corresponding to the physical exit portion of the accumulator and proceeding upstream therefrom.

Each time a unit product is detected leaving the accumulator the continuous-fill-accumulation data element, if greater than zero, is decremented (decreased by one). Thus, in addition to changing as a result of data transfer from a selected portion of the data array, the continuous-fill-accumulation element is also changed in value by decrementing caused by product exit from the accumulator. The processes of data array incrementing, continuous-fill-accumulation data element decrementing and data shifting/transfer occur asynchronously i.e. not simultaneously except by coincidence.

Low level and high level sensors may be provided to confirm or correct certain data values in the continuous-fill-accumulation data element and to provide initial data information at system start up.

BRIEF DESCRIPTION OF THE DRAWINGS

FIG. 4 is a block diagram illustrating certain non-region protected accumulator peculiar constant values used in performing the software functions of the present invention.

FIG. 5 is a block diagram illustrating certain non-region protected accumulator peculiar variable values used in performing the software functions of the present invention.

DETAILED DESCRIPTION OF THE INVENTION

This application includes a software appendix which forms a part of the description of the invention.

Figure 1:
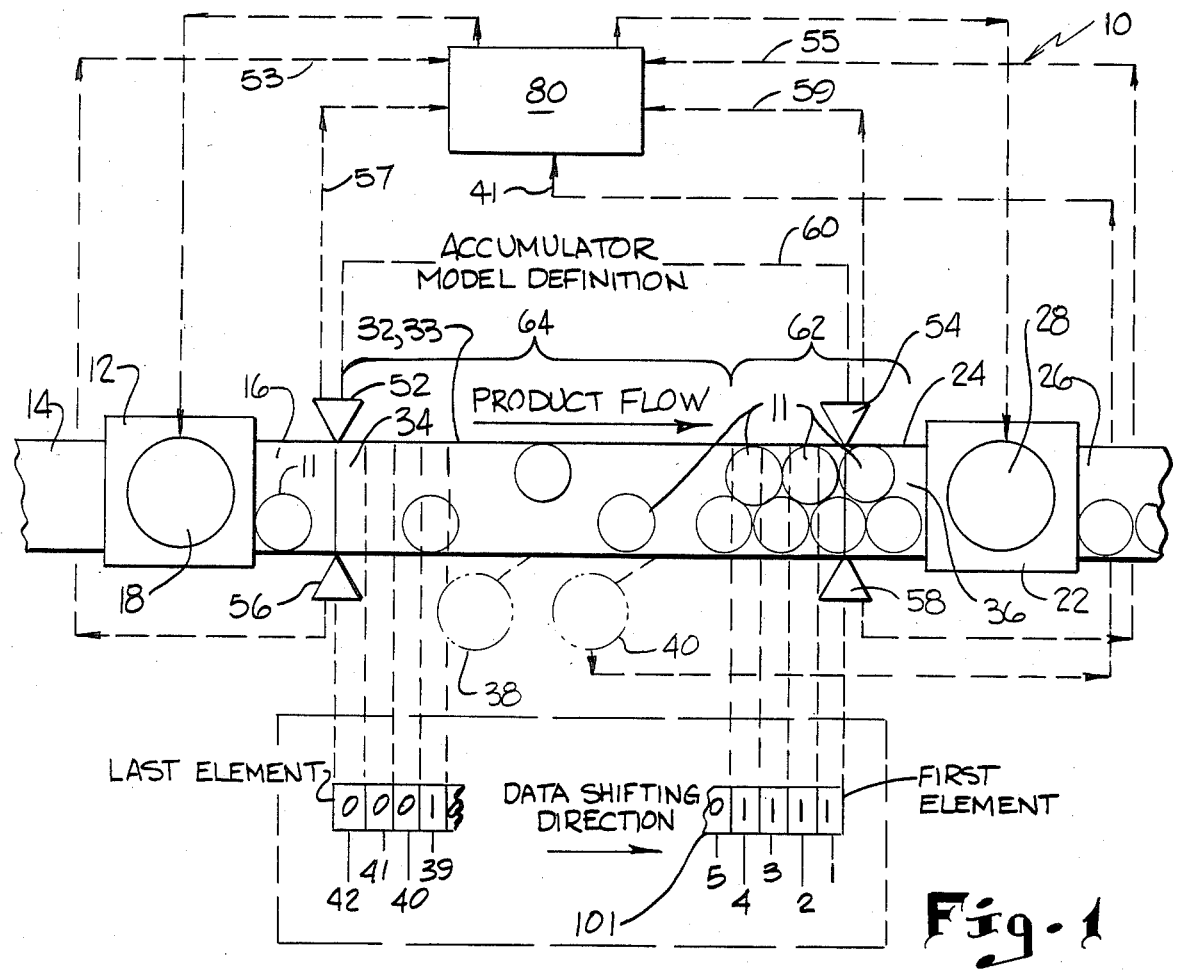
FIG. 1 is a schematic plan view of the physical components and a portion of the software components of a product processing system of the present invention.
Figure 6:
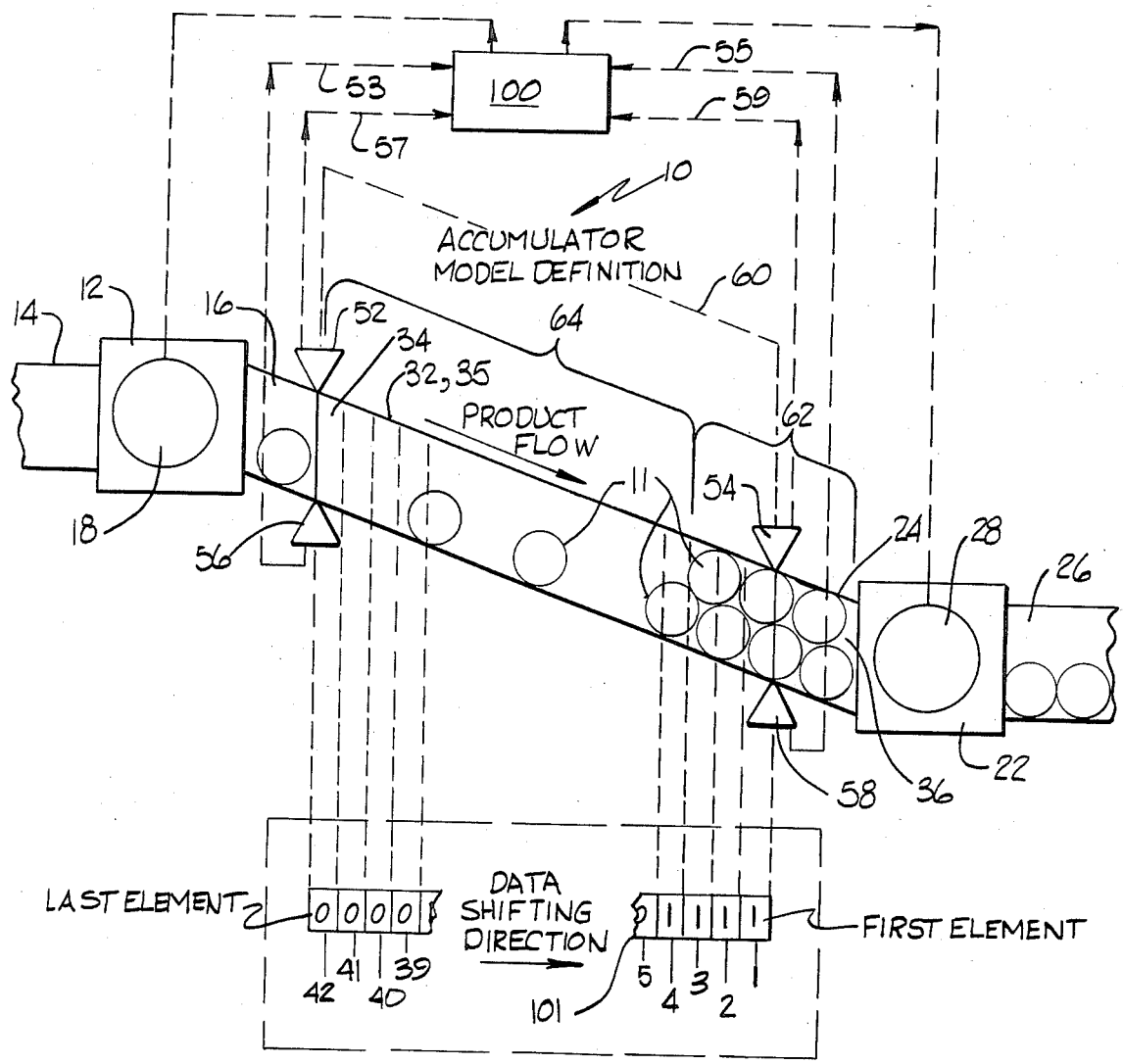
FIG. 6 is a schematic elevation view of an alternate embodiment of the invention illustrated in FIG. 1.

The continuous processing system 10 of the present invention is used for the continuous processing of unit products 11 such as for example can bodies which pass through a discrete upstream machine 12 such as a can necking machine and a discrete downstream machine 22 such as a can flanging machine which are coupled together by an accumulator 32. As illustrated in FIGS. 1 and 6 the upstream machine 12 may comprise a product inlet 14 for receiving unit products, a product outlet 16 for discharging unit products and a variable speed upstream machine motor 18. Downstream machine 22 may comprise a product inlet 24, a product outlet 26, and a variable speed downstream machine motor 28. The accumulator 32 may be for example a conveyor belt 33 type accumulator as illustrated in FIG. 1 or a free fall track 35 type accumulator as illustrated in FIG. 6. The accumulator 32 comprises an accumulator product inlet 34 interfacing with the upstream machine product outlet 18 and also comprises an accumulator product outlet 36 interfacing with the downstream machine product inlet 24. In the case of a conveyor belt type conveyor 33 as illustrated in FIG. 1, the accumulator may be driven by a motor 38 which may be a variable speed motor. In the case of a variable speed accumulator an accumulator speed sensing device 40 such as an encoder physically engaging a conveyor belt or a accumulator motor tachometer may be provided. A count-in sensor 52 is positioned opposite the accumulator inlet 34 and a product count-out sensor 54 is positioned opposite the accumulator outlet 36. A high level sensor 56 is positioned opposite the accumulator count-in sensor 52 and a product low level sensor 58 is positioned opposite the count-out sensor 54. The product count-in sensor 52 counts each unit product 11 entering the accumulator and provides a count-in signal 57 responsive thereto to computer or data processing unit 80. The product count-out sensor 54 counts each product as it leaves the accumulator and provides a count-out signal 59 responsive thereto to the data processing unit. High level sensor 56 senses whether the continuous accumulation has reached the accumulator inlet and provides a high level signal 53 responsive thereto to data processing unit 80. Low level sensor 58 senses whether the continuous fill level has fallen below the accumulator exit and provides a signal 55 responsive thereto to the data processing unit 80. As products flow through the accumulator from the upstream machine to the downstream machine an accumulation of relatively tightly packed continuously touching products, the continuous accumulation 62, may be provided adjacent the downstream machine product inlet 24. The speed of movement of the products in the continuous accumulation 62 is dependent upon the speed of the downstream machine 22. Products passing from the upstream machine into the accumulator prior to entering the continuous accumulation 62 have a speed through the accumulator which is dependent only upon the characteristics of the accumulator. For example in the embodiment illustrated in FIG. 1 the speed of the products in the loosely packed floating accumulation 64 is dependent upon the speed of conveyor 33 and in the case of the free fall track accumulator 35 illustrated in FIG. 6 the product speed in the floating accumulation 64 is the free fall velocity of the product within track 35. The position of the high level sensor 56 and the low level sensor 58 define the length of an accumulator model which is used by the data processing unit 80 in performing the functions necessary for machine motor control. It will be appreciated by those having skill in the art after reading this application that the accumulator model definition provided by the spacing of the high and low level sensors 56, 58 need not conform exactly with the length of the associated physical accumulator assembly. However, in a preferred embodiment the actual physical length of the accumulator and the computer accumulator model definition are identical.

In operation a product 11 entering accumulator 32 from the upstream machine 12 is sensed by count-in sensor 52 which provides a count-in sensor signal 53 to data processing unit 80. The processing unit 80 increments the computer model in response to sensor signal 53. The product 11 thereafer moves through the accumulator loosely packed region 64 at a speed dependent upon the particular characteristics of the accumulator until reaching the accumulator tightly packed area 62. Upon reaching the tightly packed area 62 the speed of the product is determined by the rate at which the downstream machine 22 is operating. The computer accumulator model shifts data corresponding to the unit product therethrough in a manner which simulates the physical movement of unit products through the accumulator. As the unit product leaves the tightly packed region 62 and enters the downstream machine product inlet portion 24 it is counted by count-out sensor 54 which provides a signal 55 responsive thereto to computer 80. The accumulator model is decremented in response to signal 55. The relative length of the tightly packed accumulation area 62 within the accumulator 32 will vary depending upon the rate of products entering and leaving the accumulator and on the accumulator transfer characteristics e.g. the speed at which conveyor belt 33 is operating or the free fall velocity characteristics of free fall track 35. In the case of a variable speed conveyor such as illustrated in FIG. 1 a signal 41 indicative of the accumulator speed is sent by the accumulator speed sensing device 40 to the data processing unit 80. The accumulator model takes all of these variables into account. If the continuous accumulation area 62 extends to the high level sensor 56 a high level sensor signal 57 is provided to the data processing unit 80. If the tightly packed accumulation level falls below the low level sensor 58 then a low level sensor signal 59 is sent to the data processing unit 80. Using the information provided by signals 53, 55, 57, and 59 and in some cases 41 data processing unit 80 computes a value representative of the number of unit products in the continuous accumulation area 62 at periodic intervals and using this computed value generates a control signal for controlling the speed of upstream machine motor 18 and/or downstream machine motor 28 to provide a proper flow of unit products through the accumulator. A proper flow of unit products is one in which a sufficient continuous accumulation is provided to allow continuous product feed to the downstream machine without creating an excessive product accumulation.

Figure 2:
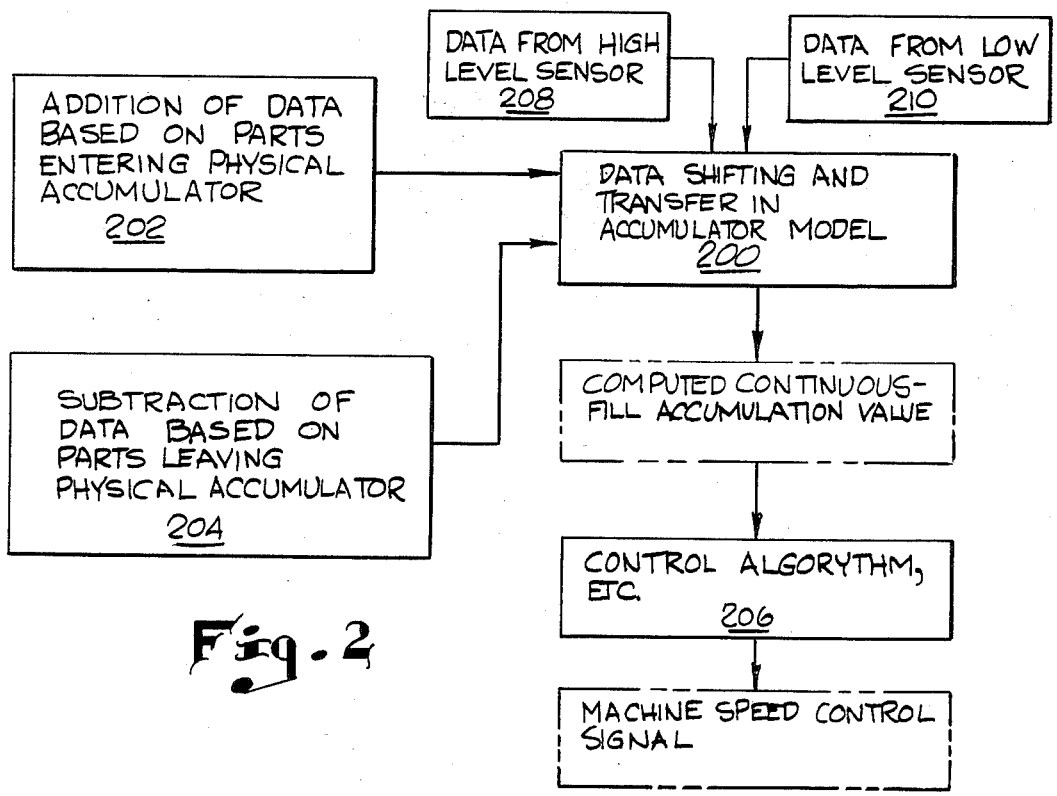
FIG. 2 is a flow diagram illustrating some major software functions of the processing system of the present invention.

Having thus described the basic mechanical and sensing device components of the present invention the associated computer software will now be described. The basic functions of the computer software are illustrated in FIG. 2. The computer software provides an accumulator model 200 which periodically moves data therethrough in a manner simulating the movement of unit products through the physical accumulator. Data is added to the accumulator model based on parts entering the physical accumulator as represented generally at 202. Data is also subtracted from the accumulator model 200 based on the exiting of parts from the physical accumulator as illustrated at 204. From these three primary functions: data addition to the accumulator model, data subtraction from the accumulator model, and data shifting and transfer within the accumulator model a continuous-fill accumulation value is computed which predicts the number of unit products in the continuous accumulation area 62 of the physical accumulator 32. From this computed continuous-fill accumulation value a conventional control algorithm 206 is used to calculate the relative speed difference between the upstream machine and the downstream machine needed to maintain proper operating conditions in the system and a control signal responsive thereto is provided to the appropriate machine motor or motors to maintain such control. Control may be maintained by increasing or decreasing speed of the upstream machine motor 18 or the downstream machine motor 28 or by appropriately adjusting the speed of both the upstream and downstream machine motors. Algorithms for controlling machine speed operation in this manner are conventional and well-known in the art. In addition to these primary functions 200, 202, 204 used for computing the continuous-fill-accumulation value, data entry functions 208, 210 may also be provided through the high and low level sensors 56, 58 to correct data values within the accumulation model 200. This function is most important at system start up when no previous data values or incorrect data values from the previous operation may be present in the accumulator model 200. After the system has been operational for a short period of time such data correction input is generally unnecessary but may be used to confirm proper operation of the system and may be used to overridingly shut the system down in the event that the sensed tightly packed area falls below the low level sensor or exceeds the high level sensor.

Figure 3:
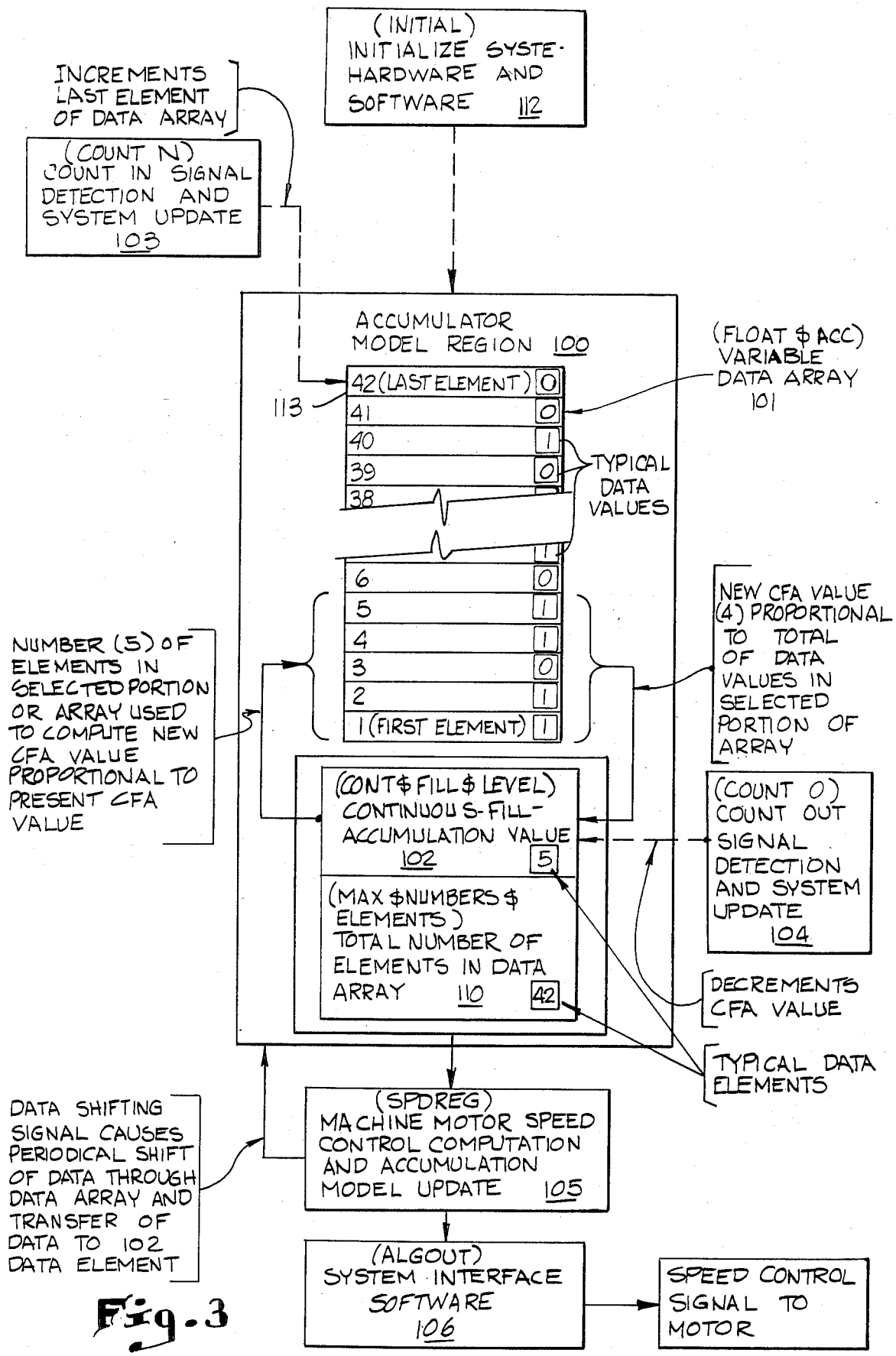
FIG. 3 is a block diagram more specifically illustrating software tasks and variable data storage locations used for performing the software functions of the present invention.

The software and certain data values for performing the functions illustrated in FIG. 2 is shown schematically in FIGS. 3-5. In FIGS. 3-5 the various software tasks and data values are briefly described and indicated with reference numerals and are also given names which correspond to the names used in the attached software appendix. The accumulator model protected region 100 comprises a variable data array (FLOAT$ACC) 101 which may be a conventional single dimension data array which is used to track a numeric representation of unit products through the physical accumulator. The data array consists of a finite number of serially arranged elements e.g. elements 1 through 42 as illustrated in FIGS. 1, 3 and 6. Each element is the data array corresponds to a physical portion of the accumulator. In FIGS. 1 and 6 it is shown that the first element of the data array corresponds to the last physical element i.e. the exit of the accumulator and the last element of the data array corresponds to the first physical element i.e. the entrance of the accumulator. Data moves through the variable data array 101 from the last element to the first element. Of course the designation "first" and "last" element is arbitrary i.e., the "first" element of the data array could be made to correspond with the entrance portion of the physical accumulator. However, the present naming convention has been used to conform with an embodiment of the invention software illustrated in the software appendix of the application which forms a part hereof. The method of calculating the number of elements required for the data array is described in detail hereinafter.

The accumulator model protected region 100 also comprises a continuous-fill-accumulation variable data element (CONT$FILL$LEVEL) 102 which stores the numeric representation of the continuous accumulation 62 in the physical accumulator. Data is transferred from data array 101 to data element 102 during each system iteration.

The accumulator model protected region 100 also comprises a data element (MAX$NUMBER$ELEMENTS) 110 which stores a value equal to the total number of elements in data array 101.

The software task which detects the count-in signal 53 from the count-in sensor and adds data to the accumulator model protected region is represented as task (COUNTN) 103. This task increments the last element of the data array 101 each time a count-in signal is detected. Count-out task (COUNTO) 104 detects each count-out signal and updates the system responsive thereto by decrementing the continuous-fill accumulation value in data element 102 each time the count-out signal from sensor 58 is detected. Task (SPDREG) 105 is the software task which maintains the model of the physical accumulator and computes the required machine speed control action for the upstream and/or downstream machine in response thereto. This task also updates the accumulator model region 100 at periodic intervals which may be time-based in the case of constant velocity or free fall type accumulator such as illustrated in FIG. 6 or which may be variable speed-based in the case of variable speed accumulators such as illustrated in FIG. 1. System interface software task (ALGOUT) 106 translates the control action computed by task 105 to an acceptable format for controlling the applicable machine motor or motors. In addition to the region protected values in the accumulator model region 100, a number of non-region protected constant values which are dependent upon the particular accumulator used must also be input into the computer 80. These values are illustrated in FIG. 4 and include the maximum possible tightly packed product accumulation between the high and low level sensors (MAX$FILL) 107. (MAX$FILL) 107 is used only in the case of a free fall or constant velocity accumulator model. The total elapsed time for product to move unobstructed from the high level sensor to the low level sensor (TRANSIT$TIME) 108 is also required for a free fall or constant velocity computer as is the update interval (UPDATE$INTERVAL) 109 for shifting data through the data array 101 and transferring data to the continuous-fill accumulation element 102. A required constant value for all accumulators indicated as (ACCUMULATION$LENGTH) 115 is the physical length of the accumulator to be modeled. In the case of a variable speed accumulator the resolution in pulses-per-unit length of the accumulator provided by the accumulator speed sensing device such as 40 is required and is indicated as (PULSES$PER$UNIT$LENGTH) 116.

A number of variable values which are dependent upon a particular accumulator which are not provided in the model region 100 are also require as indicated in FIG. 5. These variables include the number of elements in the data array 101 to have data therein transferred to the continuous-fill accumulation variable data element 102 which is indicated as (NUMBER$ELEMENTS$TRANSFER) 111; the status of the accumulator high level sensor 56 on a previous iteration of the model update 105 as indicated as (OLD$ACCUMULATOR$LEVEL$HIGH) 119; the status of the accumulator low level sensor 58 on a previous iteration of the model update 105 as indicated as (OLD$ACCUMULATOR$LEVEL$LOW) 120; the status of the accumulator high level sensor 56 on a current iteration of the model update 105 as indicated as (ACCUMULATOR$LEVEL$HIGH) 121; and the status of the accumulator low level sensor 58 on a previous iteration of the model update 105 as indicated as (ACCUMULATOR$LEVEL$LOW) 122.

Thus an accumulator modeling means comprising the software tasks and data storage elements illustrated in FIGS. 3-5 is provided which predicts the continuous accumulation 62 in the accumulator 32 at frequent intervals. A conventional speed control algorithm is them applied to each predicted continuous accumulation value by machine speed control means, indicated generally as 206 in FIG. 2, which generate a signal used to control the upstream and/or downstream machines 12, 22.

Having thus described the basic components of the system's software the method of calculating certain software values will now be described. With respect to the number of elements in the variable data array in the case of a free fall or constant velocity accumulator model, the number of elements indicated at 110 to be used in the variable data array 101 is calculated by dividing the product transit time indicated as constant value 108 in FIG. 4 by the update interval indicated at 109 in FIG. 4. In the case of a variable speed accumulator having a pulsed speed indicating signal such as provided by a motor tachometer or encoder, the number of elements in the data array is computed by multiplying the accumulator length indicated at 115 in FIG. 4 by the pulses-per-unit length of the speed indicating signal indicated at 116 in FIG. 4. The computed number of elements transferred from the variable data array 101 to the continuous-fill-accumulation variable data element 102 in any system iteration is equal to the present value of the continuous-fill accumulation data element 102 multiplied by the number of elements in the data array 101 divided by the maximum possible number of products in the accumulator which may be expressed: [NUMBER$ELEMENTS$TRANSFER (111)] = [CONT$FILL$LEVEL (102)]times [MAX$NUMBER$ELEMENTS (110)]divided by [MAX$FILL (107)].

Having thus described the basic mechanical and software components of the system, operation of the system will now be described. The system is started by initializing the system as indicated in task (INITIAL) 112. This initialization function is the setting of the accumulator constant parameters to the appropriate values and also the setting of the variable data values in region 100 to zero. The constant variables may be set into permanent memory at the time of program calculation or alternately might be set using a conventional keyboard into non-permanent memory for use as long as the system is powered. The following information about the particular accumulator to be employed is placed into memory for the measuring system tasks to use:

In the case of a free fall or constant velocity type accumulator model (a time-driven model), the transit time 108, the update interval 109, and the maximum number of parts that can be stored in the accumulator between the high level sensor and the low level sensor 107 are placed into memory.

In the case of a variable speed accumulator (an accumulator position/variable speed driven model) the accumulator length 115 and the speed indicating device resolution in pulses-per-unit length 116 are put into memory.

Next, all of the elements of the variable data array 101 and the continuous accumulation variable data element 102 are set to zero. The system is now ready for operation.

As a unit part 11 enters the accumulator from the upstream machine outlet 16 it is sensed by the count-in sensor 52 which generates an electronic pulse in response thereto. The electronic pulse is detected by software task 103 which increments the last element 113 of the data array which is indicated in FIGS. 1, 3 and 6 as upstream most element 42.

As a unit product 11 leaves the accumulator it passes past count-out sensor 54 which generates an electrical pulse in response thereto which is detected by software task 104. Task 104 upon detecting the count-out signal decrements the variable data element 102 by one in response thereto if the value of element 102 is greater than zero.

Movement of data through variable data array 101 is controlled by task 105. Task 105 may be run on a regular periodic time basis if the accumulator has a free fall or constant velocity product movement therethrough as illustrated in FIG. 6. The regular periodic running of the task 105 in such a case provides a clocking method for tracking the part movement through a free fall or constant velocity accumulator. Optionally, task 105 may be run based on an accumulator position signal i.e. a variable speed-based signal from a speed sensing device such as 40 illustrated in FIG. 1. In either situation, the running of task 105 corresponds to part movement through the accumulator. Each time task 105 runs the continuous-accumulation variable data element 102 is updated and used to determine the number of data elements from the variable data array 101 that are to have data therefrom summed and transferred to element 102. The number of data elements in data array 101 to have their data transferred to element 102 is represented in FIG. 3 as those elements included in bracket 111 and, as explained above, is equal to the present value of continuous-accumulation variable data element 102 multiplied by the total number of elements in the data array divided by the maximum number of tightly packed product accumulation possible between high and low level sensors which is indicated as data element 107. The embodiment of FIG. 3 shows a situation in which the value of constant 107 and 111 are equal and in which case the number of elements to be transferred is simply equal to the value of the continuous-fill-accumulation 102. Thus in this embodiment the continuous-fill-accumulation element 102 is updated by adding all values from the first element of the data array 101 through the element in the data array equal to the present value of the continuous-fill-level 102, which is "5" in this example. Once the data is transferred from the data array elements shown bracketed at 111 to the continuous fill level element 102, the values of the elements shown bracketed at 111 are set to zero and the remaining elements in the data array have their values moved one position through the data array, i.e. the values are transferred from each element in the data array to the next lower element in the data array.

Once the transfer of data to element 102 is completed, the value of element 102 is checked against the accumulator low level sensor 58 and the accumulator high level sensor 56. This is done to correct for initial start up conditions when the computer is first turned on and the part accumulation in the accumulator is unknown. It also acts as a check on the computations being done to model the process.

The present value of the high level sensor signal 121 is compared against the previous value of the high level sensor 119 for an indication of the continuous accumulation value 102 reaching the value associated with the high accumulation sensor signal. If the continuous accumulation value 102 is within a reasonable value of the high level sensor value, no adjustment of the continuous accumulation value 102 is made. If value 102 is not within the prescribed limits, then it is reset to the value associated with the maximum tightly packed accumulation value 107. If both the present values of the high level sensor and the low level sensor indicate parts in accumulator and the continuous accumulation value 102 is not within a prescribed tolerance of the value 107, then the value 102 is set to the maximum tightly packed accumulation value 107. A further check is performed against the present value of the low level sensor to verify if there are any parts at all in the accumulator. If the low level sensor indicates that there are no parts, then the value 102 is set to zero indicating no parts in the accumulator. The present value of the high level sensor and the low level sensor are thereafter stored in the previous iteration storage positions 119 and 120, respectively, for use on the next iteration of task 105. At the end of each iteration of task 105 the computed value stored in continuous-fill accumulation element 102 is used to compute a control signal for controlling the speed of the upstream and/or downstream motors 18, 28. In the example illustrated in the attached appendix software, a simple proportional control algorithm is applied to the downstream machine motor to affect control of the accumulator level. Such control algorithms are well-known in the industry and may comprise proportional, derivative, and integral control algorithms. The control algorithm applied computes an appropriate machine speed to satisfy a predetermined control strategy and then translates the machine speed to a value acceptable to a conventional signal conversional module to provide the proper signal to the variable speed motor 28 connected to the downstream machine 22. In the appendix softward provided the appropriate downstream machine speed is computed based on the value in element 102 on every iteration of the task 105. The larger the value of the data variable in 102, the higher the required downstream machine speed. The frequency of running task 105 determines the information update interval for control of the downstream machine.

Program printouts for performing the various software tasks described herein are provided in the attached appendix. Names of the various tasks and data values used in the appendix correspond to the names given in this section of the application. All information in the appendix comprises a part of the disclosure of the present invention.

The various physical devices which form components of the processing system of the present invention are well known in the art and may be any of a number of commercially available products.

The inventory measuring and control system described may be implemented in software using a general purpose microcomputer system with analog output capability such as model SBC 86/30 in combination with model iSBX328 manufactured by Intel Corporation of 3200 Lakeside Drive, Santa Clara, Calif. 95051, using a software operating system such as Model RMX/86 manufactured by Intel Corporation. The interface of such software with such a computer and conventional hardware will be obvious to any person with ordinary skill in the art after reading this disclosure. The implementation of the invention disclosed in the attached software appendix may be performed using the above listed software and microcomputer.

It is contemplated that the inventive concepts herein described may be variously otherwise embodied and it is intended that the appended claims be construed to include the alternative embodiments of the invention except insofar as limited by the prior art.

```
HARDWARE
(CPU) PROCESSOR USED IN THE SYSTEM                         8086
(OSP) 80130 OPERATING SYSTEM EXTENSION [Yes/No]            No
(TP)  8253/8254 TIMER PORT [0-0FFFFH]                      00D0H
(CIL) CLOCK INTERRUPT LEVEL [0-7]                          0002H
(CN)  TIMER COUNTER NUMBER [0,1,2]                         0000H
(CI)  CLOCK INTERVAL [0-0FFFFH MSEC]                       000AH
(CF)  CLOCK FREQUENCY [0-0FFFFH KHZ]                       04CDH
(TPS) TIMER PORT SEPARATION [0-0FFH]                       0002H
(NPX) NUMERIC PROCESSOR EXTENSION [Yes/No]                 Yes
(NIL) NPX INTERRUPT LEVEL [Encoded]                        0008H
INTERRUPTS
(MP)  8259A MASTER PORT [0-0FFFFH]                         00C0H
(MPS) MASTER PIC PORT SEPARATION [0-0FFH]                  0002H
(SIL) SLAVE INTERRUPT LEVELS [0-7/None]                    None
(LSS) LEVEL SENSITIVE SLAVES [0-7/None]                    None
MEMORY
TYPE : RAM = LOW, HIGH
TYPE : ROM = LOW, HIGH
TYPE : RAM = 0104H, 0FFFH
TYPE : ROM = F000H, FFFFH
SUB-SYSTEMS
(UDI) UNIVERSAL DEVELOPMENT INTERFACE [Yes/No]             No
(HI)  HUMAN INTERFACE [Yes/No]                             No
(AL)  APPLICATION LOADER [Yes/No]                          No
(EIO) EXTENDED I/O SYSTEM [Yes/No]                         No
(BIO) BASIC I/O SYSTEM [Yes/No]                            No
(SDB) SYSTEM DEBUGGER [Yes/No]                             No
(DDB) DYNAMIC DEBUGGER [Yes/No]                            Yes
(TH)  TERMINAL HANDLER [Yes/No]                            Req
(CA)  CRASH ANALYZER [Yes/No]                              No
DYNAMIC DEBUGGER/TERMINAL HANDLER
(CF)  CLOCK FREQUENCY [0-0FFFFH KHZ]                       04CDH
(BR)  BAUD RATE [0-0FFFFH]                                 2580H
```

```
(OTU) 80130 O.S.P Timer Used [Yes/No]              No
(TBP) Timer Base Port [0-0FFFFH]                   00D0H
(TPS) Timer Port Separation [0 - 0FFH]             0002H
(CN)  Timer Counter Number [0,1,2]                 0002H
(UBP) Usart Base Port [0-0FFFFH]                   00D8H
(UPS) Usart Port Separation [0 - 0FFH]             0002H
(DDT) Dynamic Debugger Terminal Handler [Yes/No]   Yes
(IOV) Input/Output Version [Yes/No]                Yes
(IMN) Input Mailbox Name [1-12 Chars]              RQTHNORMIN
(OMN) Output Mailbox Name [1-12 Chars]             RQTHNORMOUT
(IIL) Input Interrupt Level [Encoded]              0068H
(OIL) Output Interrupt Level [Encoded]             0078H
(RM)  Rubout Mode [Echo/Replace]                   Replace
(BC)  Blanking Character [0-0FFH]                  0020H
(SIC) Size of Characters [7,8]                     7
(CC)  Control-C Required [Yes/No]                  No
(UC)  Name of Control-C Object File [0-32 Chars]
Nucleus
(ASC) All Sys Calls [Yes/No]                       Yes
(PV)  Parameter Validation [Yes/No]                No
(ROD) Root Object Directory Size [0 - 0FF0H]       0040H
(MTS) Minimum Transfer Size [0-0FFFFH]             0040H
(DEH) Default Exception Handler [Yes/No/Deb/Use]   Dynamic Debugge
(NEH) Name of Ex Handler Object Module [1-32chs]
(EM)  Exception Mode [Never/Program/Environ/All]   All Exceptions
(SRR) Start Root Job from Reset [Yes/No]           Yes
User Jobs
(NAM) Job Name [0-14 characters]                   C30TNF
(ODS) Object Directory Size [0-0FF0H]              0100H
(PMI) Pool Minimum [20H - 0FFFFH]                  0400H
(PMA) Pool Maximum [20H - 0FFFFH]                  FFFFH
(MOB) Maximum Objects [1 - 0FFFFH]                 FFFFH
(MTK) Maximum Tasks [1 - 0FFFFH]                   FFFFH
(MPR) Maximum Priority [0 - 0FFH]                  0000H
(AEH) Address of Exception Handler [CS:IP]         0000H:0000H
(EM)  Exception Mode [Never/Prog/Environ/All]      All Exceptions
(PV)  Parameter Validation [Yes/No]                No
(TP)  Task Priority [0-0FFH]                       0020H
(TSA) Task Start Address [CS:IP]                   A000H:000DH
(DSB) Data Segment Base [0-0FFFFH]                 0000H
(SSA) Stack Segment Address [SS:SP]                0000H:0000H
(SS)  Stack Size [0-0FFFFH]                        0400H
(NPX) Numeric Processor Extension Used [Yes/No]    Yes
User Modules
Module : 1-55 characters
ROM Code
(THR) Terminal Handler(s) in ROM [Yes/No]          Yes
(NIR) Nucleus in ROM [Yes/No]                      Yes
(RIR) Root Job in ROM [Yes/No]                     Yes
Includes and Libraries
Path Name [1-45 Characters]
(UDF) UDI Includes and Libs
                                         :F0:
(HIF) Human Interface Includes and Libs
                                         :F0:
(EIF) Extended I/O System Includes and Libs
                                         :F0:
```

(ALF) Application Loader Includes and Libs
                                         :F0:
(BIF) Basic I/O System Includes and Libs
                                         :F0:
(SDF) System Debugger Includes and Libs
                                         :F0:
(THF) Terminal Handler and Dynamic Debugger Includes and Libs
                                         :F0:
(NUF) Nucleus and Root Job Includes and Libs
                                         :F0:
(ILF) Interface Libraries
                                         :F0:
(CAF) Crash Analyzer Includes and Libs
                                         :F0:
(DTF) Development Tools Path Names
                                         :F0:
Generate File Names
File Name [1-55 Characters]
(ROP) ROM Code Prefix
                                         :F1:
(RAF) RAM Code File Name
                                         :F1:C30TNF.RAM

============================================================

86/30 CPU BOARD JUMPER CONFIGURATION
FOR THE ACCUMULATOR LEVEL CONTROL SYSTEM

============================================================

LAST MODIFIED 2/28/85

MODIFICATION LIST:
------------------------------------------------------------
2/28/85    - ADDED NOTE 1.
------------------------------------------------------------

REFERENCE INTEL'S ISBC 86/14/30 SINGLE BOARD COMPUTER HARDWARE REFERENCE MANUAL
AND INTEL'S IRMX/86 OPERATING SYSTEM INSTALLATION GUIDE.

* - DENOTES FACTORY DEFAULT JUMPER

************************************************************
* NOTE 1: THE PLASTIC HEADER STYLE JUMPERS MAY HAVE TO BE REMOVED AND A *
* WIRE WRAP JUMPER SUBSTITUTED ON THOSE PINS REQUIRING MULTIPLE         *
* CONNECTIONS.                                                          *
************************************************************

------------------------------------------------------------
4X9 75/6448 CARDCAGE BACKPLANE JUMPERS
------------------------------------------------------------

THE 86/30 SINGLE BOARD COMPUTER MUST BE PUT IN SLOT J5 SO IT CAN CONTROL THE
MULTIBUS AS BUS MASTER. THE FOLLOWING MULTIBUS BACKPLANE JUMPER MUST BE
INSTALLED FOR SLOT J5 TO BE THE EXCLUSIVE BUS MASTER.

------------------------------------------------------------
1              CARD SLOT J4              86
------------------------------------------------------------

```
 ||...   (WIRE WRAP HEADER)
 1 2 3 4 5
-----------------------------------------------------------------
 1                      CARD SLOT J5                          86
-----------------------------------------------------------------
```

INTERRUPT MATRIX
-----------------

```
       JUMPERS
  IN           OUT
E165-E166                PIC LEVEL 0 - NPX (ISBX 337A)
---------    ---------   PIC LEVEL 1 - NOT USED
E147-E158                PIC LEVEL 2 - RMX/86 SYSTEM CLOCK
---------    ---------   PIC LEVEL 3 - NOT USED
E132-E157                PIC LEVEL 4 - PA INT 8255-PORT C-BIT 5 (PART OUT OF ACCUMULATOR)
E143-E152    E151-E152*  PIC LEVEL 5 - PB INT 8255-PORT C-BIT 4 (PART INTO ACCUMULATOR)
E153-E155                PIC LEVEL 6 - 8251A RxRDY
E154-E156                PIC LEVEL 7 - 8251A TxRDY

E33 -E34    NON-BUS VECTORED INTERRUPTS
E144-E145*               DISABLE NONMASKABLE INTERRUPT TO 8086-2
```

EPROM 64K RANGE ON BOARD
-------------------------

THE ON-BOARD EPROM CONTAINS THE INTEL IRMX/86 OPERATING SYSTEM

ADDRESS RANGE - F0000H TO FFFFFH

```
       JUMPERS
  IN           OUT
E96 -E97                 SELECT BASE ADDRESS OF F0000
E96 -E102
E109-E110    E108-E109*
E112-E113    E111-E112*

E123-E124                SELECT 27128 DEVICES
E124-E125

- PROM PLACEMENT -
                         U39 - F0000H ODD
                         U40 - F8000H ODD
                         U57 - F0000H EVN
                         U58 - F8000H EVN
```

RAM 128K RANGE ON BOARD
------------------------

ADDRESS RANGE 0 TO 1FFFFH

```
       JUMPERS
  IN           OUT
               E217-E224   MEGABYTE PAGE 0 SELECT
               E217-E223
               E218-E221
               E219-E220
```

```
                E234-E235      ALL 128K DUAL PORT RAM AVAILABLE TO THE BUS
                E236-E237

E199-E200*     ENABLE DUAL PORT RAM
E118-E119*                     128K ON BOARD

E225-E217(GND) 256K PAGE SELECT (0 - 3FFFFH)
                E226-E217(GND)

E232-E233                      ENDING 32K BOUNDRY = 1FFFFH
                E230-E231
                E240-E241
```

---

GENERAL CPU PARAMETERS

```
     JUMPERS
   IN        OUT
  E5 -E9    E4 -E8      1 EPROM WAIT STATES (250 NSEC EPROMS)
            E7 -E11
            E6 -E10

E13 -E14*   E12 -E13    2 I/O WAIT STATE

E36 -E37    8MHZ CPU OPERATION
            E38 -E39    DISABLE FAILSAFE TIMER
```

---

SERIAL PORT (8251A)

```
        JUMPERS
    IN         OUT
E76 -E77                RST TO CTS
E173-E187*              DTR-DSR
```

THESE TWO JUMPERS ALLOW THE USE OF A STRAIGHT THRU RS-232C CABLE TO THE
VUPOINT DISPLAY

---

PARALLEL PORT (8255)

*** ASSUMES OPERATION IN MODE 0 ***

```
        JUMPERS             COMPONENTS REQUIRED
    IN         OUT
E52 -E53   E61 -E52*    U17 - 8287*              PORT A (CB) - INPUT

---------  ---------    U20 - 7409 (DRIVER)      PORT B (CA) - OUTPUT
                        U21 - 7409 (DRIVER)

E56 -E47*               U18 - SBC 902 (1K PULLUP) PORT C (CC) - INPUT
E55 -E46*               U19 - SBC 902 (1K PULLUP)
E54 -E45*
E53 -E44*
E57 -E48*               PORT C BIT 0 (ACCUMULATOR LOW LEVEL)
E58 -E49*               PORT C BIT 1 (ACCUMULATOR HIGH LEVEL)
```

```
E57 -E50*
E60 -E51*

E56 -E64                    PORT C BIT 4 TO PB-INT (TRIGGER TASK COUNTN)
E55 -E63                    PORT C BIT 5 TO PA INT (TRIGGER TASK COUNTO)

-----------------------
MULTIMODULE POSITION J3
(NOT USED)
-----------------------

BOARD JUMPERS
  IN            OUT

MULTIMODULE JUMPERS
  IN            OUT

-------------------------------
MULTIMODULE POSITION J4
ISBX 328 8-CHANNEL ANALOG OUTPUT
-------------------------------

BOARD JUMPERS
  IN            OUT
  -------- NONE --------

MULTIMODULE JUMPERS
  IN            OUT
                E1 -E2       OFFSET TO BE GENERATED VIA SOFTWARE
  E3 -E4                     UNIPOLAR(0-5vDC) AND CURRENT LOOP OPERATION (4-20MA)
  E5 -E6
  E7 -E8        E7 -E7                              1-14

E28 -E35      E20 -E28     CHANNEL 0 AS CURRENT LOOP
                             CHANNELS 1 - 7 DON'T CARE

SERIES-III PL/M-86 V2.3 COMPILATION OF MODULE STJOB1
OBJECT MODULE PLACED IN :F4:STJOB1.OBJ
COMPILER INVOKED BY:  PLM86.86 :F4:STJOB1.P86

$LARGE ROM
            $DEBUG
            $OPTIMIZE(0)
            $TITLE('TASK START JOB 1')
            /*
            =================================================
               TASK START JOB 1

COPYRIGHT ADOLPH COORS CO.
                   GOLDEN, COLORADO 80401
                   SEPTEMBER 19,1984
            =================================================
            */
    1       STJOB1: DO;
            /*
            ****************************************************************
            *
```

```
*PRIORITY NOT APPLICABLE
*
*RECEIVES:   MESSAGE----------FROM----------VIA----------COMMENTS
*
*READS PUBLIC DATA: NONE
*WRITES PUBLIC DATA: NONE
*
*FUNCTION:   TASK START JOB 1 CREATES TASK INITAL.  IT'S SOLE REASON FOR
*            EXISTING IS SO THAT CHANGES IN TASK INITAL WILL NOT CHANGE THE
*            START ADDRESS OF THE JOB INITIALIZATION TASK (WHICH WOULD REQUIRE
*            RECONFIGURING THE SYSTEM AND REBLOWING THE NUCLEUS EPROMS).
*
*OPERATION:  UPON INITIALIZATION, TASK START JOB 1 (STJOB1) CREATES THE TASK
*            INITIALIZATION TASK (INITAL).  STJOB1 THEN MAKES THE NUCLEUS CALL
*            TO RQ$END$INIT$TASK TO RESTART THE ROOT JOB.
*
************************************************************************
*/
$EJECT
/*

*******************REVISION INSTRUCTIONS********************

WHEN REVISING THIS MODULE PLEASE ADD THE FOLLOWING
INFORMATION TO THIS FILE IN ADDITION TO REVISING
THE MASTER REVISION LISTING:

1.  DATE OF REVISION AND REVISION LETTER.
   2.  A FULL DESCRIPTION OF THE REVISION.

WITHIN THIS FILE INCLUDE THE REVISION LETTER AT THE
END OF EACH LINE ADDED OR MODIFIED AND IMMEDIATELY
PRIOR TO THE LOCATION FROM WHICH A LINE WAS REMOVED.

******************** REVISION STATUS ********************

ORIGINAL PROGRAM DATE 9/19/84
                 AUTHOR:  ROGER THOMPSON
                      OTHER
                      MODULES
REVISION      DATE    AFFECTED         DESCRIPTION           ENGINEER
--------      ----    --------         -----------           --------

*/
$EJECT
/*
============
DECLARATIONS
============
```

```
 2  1        DECLARE TOKEN LITERALLY 'SELECTOR';
 3  1        DECLARE FOREVER LITERALLY 'WHILE 1';

$INCLUDE (:F4:RMXMOS.EXT)
    =
    =        $INCLUDE (:F0:NCTOBJ.EXT)              /* RQ$CATALOG$OBJECT      */
    =1       $SAVE NOLIST
    =
    =        $INCLUDE (:F0:NCRMBX.EXT)              /* RQ$CREATE$MAILBOX      */
    =1       $SAVE NOLIST
    =
    =        $INCLUDE (:F0:NCRREG.EXT)              /* RQ$CREATE$REGION       */
    =1       $SAVE NOLIST
    =
    =        $INCLUDE (:F0:NCRSEG.EXT)              /* RQ$CREATE$SEGMENT      */
    =1       $SAVE NOLIST
    =
    =        $INCLUDE (:F0:NCRSEM.EXT)              /* RQ$CREATE$SEMAPHORE    */
    =1       $SAVE NOLIST
    =
    =        $INCLUDE (:F0:NCRTSK.EXT)              /* RQ$CREATE$TASK         */
    =1       $SAVE NOLIST
    =
    =        $INCLUDE (:F0:NDLSEG.EXT)              /* RQ$DELETE$SEGMENT      */
    =1       $SAVE NOLIST
    =
    =        $INCLUDE (:F0:NDLTSK.EXT)              /* RQ$DELETE$TASK         */
    =1       $SAVE NOLIST
    =
    =        $INCLUDE (:F0:NEINIT.EXT)              /* RQ$END$INIT$TASK       */
    =1       $SAVE NOLIST
    =
    =        $INCLUDE (:F0:NGTTYP.EXT)              /* RQ$GET$TASK$TOKENS     */
    =1       $SAVE NOLIST
    =
    =        $INCLUDE (:F0:NGTTOK.EXT)              /* RQ$GET$TYPE            */
    =1       $SAVE NOLIST
    =
    =        $INCLUDE (:F0:NLUOBJ.EXT)              /* RQ$LOOK$UP$OBJECT      */
    =1       $SAVE NOLIST
    =
    =        $INCLUDE (:F0:NRCCTL.EXT)              /* RQ$RECEIVE$CONTROL     */
    =1       $SAVE NOLIST
    =
    =        $INCLUDE (:F0:NRCMES.EXT)              /* RQ$RECEIVE$MESSAGE     */
    =1       $SAVE NOLIST
    =
    =        $INCLUDE (:F0:NRCUNI.EXT)              /* RQ$RECEIVE$UNITS       */
    =1       $SAVE NOLIST
    =
    =        $INCLUDE (:F0:NSNCTL.EXT)              /* RQ$SEND$CONTROL        */
    =1       $SAVE NOLIST
    =
    =        $INCLUDE (:F0:NSNMES.EXT)              /* RQ$SEND$MESSAGE        */
    =1       $SAVE NOLIST
```

```
=
=       $INCLUDE (:F0:NSNUNI.EXT)          /* RQ$SEND$UNITS              */
=1      $SAVE NOLIST
=
=       $INCLUDE (:F0:NSTEXH.EXT)          /* RQ$SET$EXCEPT$HDLR         */
=1      $SAVE NOLIST
=
=       $INCLUDE (:F0:NSTINT.EXT)          /* RQ$SET$INTERRUPT           */
=1      $SAVE NOLIST
=
=       $INCLUDE (:F0:NSGINT.EXT)          /* RQ$SIGNAL$INTERRUPT        */
=1      $SAVE NOLIST
=
=       $INCLUDE (:F0:NEXINT.EXT)          /* RQ$EXIT$INTERRUPT          */
=1      $SAVE NOLIST
=
=       $INCLUDE (:F0:NSLEEP.EXT)          /* RQ$SLEEP                   */
=1      $SAVE NOLIST
=
=       $INCLUDE (:F0:NSUTSK.EXT)          /* RQ$SUSPEND$TASK            */
=1      $SAVE NOLIST
=
=       $INCLUDE (:F0:NUCOBJ.EXT)          /* RQ$UNCATALOG$OBJECT        */
=1      $SAVE NOLIST
=
=       $INCLUDE (:F0:NWTINT.EXT)          /* RQ$WAIT$INTERRUPT          */
=1      $SAVE NOLIST
        $EJECT
        /*
        ----------------------------------
        EXTERNAL PROCEDURES TO BE CREATED
        ----------------------------------
        */
81  1   INITAL: PROCEDURE EXTERNAL;
82  2       END INITAL;
        /*
        ---------
        VARIABLES
        ---------
        */
83  1   DECLARE STATUS              WORD;

84  1   DECLARE (OWN$JOB$TOKEN,
                INITAL$TASK$TOKEN) TOKEN;
        $EJECT
85      STJOB1: PROCEDURE PUBLIC;

/*
        ==============
        INITIALIZATION-
        ==============
        */
            /*
            -----------
            CREATE TASKS
            -----------
```

```
86  2   STARTO:    CALL INIT$REAL$MATH$UNIT;
87  2              CALL SET$REAL$MODE (033EH);

88  2   START1:    INITAL$TASK$TOKEN = RQ$CREATE$TASK( 34,        /* PRIORITY      */
                                                      @INITAL,    /* START ADDRESS */
                                                      0,          /* DATA SEGMENT  */
                                                      0,          /* STACK POINTER */
                                                      512,        /* STACK SIZE    */
                                                      1,          /* TASK FLAGS    */
                                                      @STATUS);

89  2              OWN$JOB$TOKEN = RQ$GET$TASK$TOKENS (1,@STATUS);

90  2              CALL RQ$CATALOG$OBJECT (OWN$JOB$TOKEN,          /* THIS JOB */
                                           INITAL$TASK$TOKEN,     /* OBJECT   */
                                           @(10,'INITAL$TSK'),    /* NAME     */
                                           @STATUS);

/*
           ----------------
           RESTART ROOT JOB
           ----------------
        */
91  2              CALL RQ$END$INIT$TASK;

/*
           ----------------
           SUSPEND THISELF
           ----------------
        */
92  2              CALL RQ$SUSPEND$TASK(0,@STATUS);

93  2              DO FOREVER;
94  3              END;

95  2   END STJOB1;
96  1   END;
```

MODULE INFORMATION:

```
    CODE AREA SIZE    = 0086H    134D
    CONSTANT AREA SIZE = 000BH    11D
    VARIABLE AREA SIZE = 0006H     6D
    MAXIMUM STACK SIZE = 001CH    28D
    52 LINES READ
    0 PROGRAM WARNINGS
    0 PROGRAM ERRORS
```

DICTIONARY SUMMARY:

```
    667KB MEMORY AVAILABLE
    7KB MEMORY USED    (1%)
    0KB DISK SPACE USED
```

END OF PL/M-86 COMPILATION

```
SERIES-III PL/M-86 V2.3 COMPILATION OF MODULE INITAL
OBJECT MODULE PLACED IN :F4:INITAL.OBJ
COMPILER INVOKED BY:  PLM86.86 :F4:INITAL.P86

$DEBUG ROM LARGE
            $OPTIMIZE(3)
            $TITLE('INITIALIZATION')
            /*
                    ===================================
                    TASK INITAL
                    INITIALIZATION

COPYRIGHT ADOLPH COORS CO.
                              GOLDEN, COLORADO 80401
                              SEPTEMBER 13,1984
                    ===================================
            */
   1        INITAL: DO;
            /*
            *******************************************************************
            *PRIORITY 34
            *
            *RECEIVES:   MESSAGE----------FROM----------VIA----------COMMENTS
            *            NONE
            *
            *SENDS:      MESSAGE----------TO------------VIA----------COMMENTS
            *            NONE
            *
            *USES PUBLIC PROCEDURES:
            *READS PUBLIC DATA:
            *WRITES PUBLIC DATA:
            *
            *FUNCTION: 1) TO INITIALIZE THE NECESSARY HARDWARE ON THE ISBC 86/30
            *
            *          2) TO INITIALIZE THE ACCUMULATOR MEASURING AND CONTROL SYSTEM
            *             FOR OPERATION.
            *
            *OPERATION:
            *
            *
            *SPECIAL NOTE:  THIS TASK MUST RUN AT THE HIGHEST PRIORITY OF ALL USER TASKS.

*******************************************************************/
            $EJECT
            /*

********************REVISION INSTRUCTIONS********************

WHEN REVISING THIS MODULE PLEASE ADD THE FOLLOWING
            INFORMATION TO THIS FILE IN ADDITION TO REVISING
            THE MASTER REVISION LIST.

1.  DATE OF REVISION AND REVISION LETTER.
```

2. A FULL DESCRIPTION OF THE REVISION.
3. A LIST OF OTHER MODULES AFFECTED AS A
   DIRECT RESULT OF THIS REVISION.

WITHIN THIS FILE INCLUDE THE REVISION LETTER AT THE
END OF EACH LINE ADDED OR MODIFIED AND IMMEDIATELY
PRIOR TO THE LOCATION FROM WHICH A LINE WAS REMOVED.

********************** REVISION STATUS **********************

```
              ORIGINAL PROGRAM DATE 9/13/84
                  AUTHOR:   ROGER THOMPSON

OTHER
                          MODULES
   REVISION      DATE     AFFECTED        DESCRIPTION          ENGINEER
   --------      ----     --------        -----------          --------

*/
      $EJECT
      /*
      ============
      DECLARATIONS
      ============
      */
      /*
      ---------------
      SYSTEM LITERALS
      ---------------
      */
      $INCLUDE(:F4:SYSIO.LIT)
        =    /*#===================================##*/
        =    /**   SYSIO.LIT - SYSTEM I/O DECLARATIONS**/
        =    /*#===================================##*/
   =  /*
   =  ====================================
   =  I/O PORT DECLARATIONS FOR ISBC 86/30
   =  ====================================
   =  ------------------------
   =  PARALLEL PORT (8255 #0)
   =  ------------------------
   =  */
2 1 =  DECLARE PPI$0$PORT1 LITERALLY '0C8H';   /* PPI #0 PORT A */
3 1 =  DECLARE PPI$0$PORT2 LITERALLY '0CAH';   /* PPI #0 PORT B */
4 1 =  DECLARE PPI$0$PORT3 LITERALLY '0CCH';   /* PPI #0 PORT C */
5 1 =  DECLARE PPI$0$CONT  LITERALLY '0CEH';   /* PPI #0 PORT CONTROL */
   =  /*
   =  ------------------
   =  MULTIMODULE J4
```

```
=     iSBX 328 ANALOG I/O
=     (8-BIT ADDRESSING)
=     --------------------
=     */
6  1 = DECLARE WRITE$328          LITERALLY '80H',
=             READ$328            LITERALLY '82H',
=             RESET$328           LITERALLY '82H';
      $EJECT
      $INCLUDE(:F4:COMMON.LIT)
=     /*
=     ================
=       COMMON.LIT
=     ================
=     */
=     /* THESE ARE DECLARATIONS THAT WILL BE COMMON TO ALL PROGRAMS */

7  1 = DECLARE TOKEN              LITERALLY 'SELECTOR',
=             WAIT$INDEFINITELY   LITERALLY '0FFFFH',
=             FOREVER             LITERALLY 'WHILE 1',
=             FIFO                LITERALLY '0',
=             FIFO$8              LITERALLY '4',
=             PRIORITY$QUEUE      LITERALLY '1';

8  1 = DECLARE TRUE               LITERALLY '0FFH',
=             FALSE               LITERALLY '0',
=             ON                  LITERALLY '1',
=.            OFF                 LITERALLY '0',
=             AUTO                LITERALLY '0',
=             COVERED             LITERALLY '1',
=             CLEAR               LITERALLY '0',
=             RUN                 LITERALLY '1',
=             STOP                LITERALLY '0',
=             DOWN                LITERALLY '0',
=             UP                  LITERALLY '1',
=             JOG                 LITERALLY '0',
=             FULL                LITERALLY '1',
=             NOTFULL             LITERALLY '0',
=             ENABLED             LITERALLY '1',
=             DISABLED            LITERALLY '0';
      $EJECT
      $INCLUDE(:F4:RMXMDS.EXT)
=                                           /* RQ$CATALOG$OBJECT   */
=     $INCLUDE (:F0:NCTOBJ.EXT)
=1    $SAVE NOLIST
=                                           /* RQ$CREATE$MAILBOX   */
=     $INCLUDE (:F0:NCRMBX.EXT)
=1    $SAVE NOLIST
=                                           /* RQ$CREATE$REGION    */
=     $INCLUDE (:F0:NCRREG.EXT)
=1    $SAVE NOLIST
=                                           /* RQ$CREATE$SEGMENT   */
=     $INCLUDE (:F0:NCRSEG.EXT)
=1    $SAVE NOLIST
=                                           /* RQ$CREATE$SEMAPHORE */
=     $INCLUDE (:F0:NCRSEM.EXT)
=1    $SAVE NOLIST
```

```
=
=       $INCLUDE (:F0:NCRTSK.EXT)          /* RQ$CREATE$TASK        */
=1      $SAVE NOLIST
=
=       $INCLUDE (:F0:NDLSEG.EXT)          /* RQ$DELETE$SEGMENT     */
=1      $SAVE NOLIST
=
=       $INCLUDE (:F0:NDLTSK.EXT)          /* RQ$DELETE$TASK        */
=1      $SAVE NOLIST
=
=       $INCLUDE (:F0:NEINIT.EXT)          /* RQ$END$INIT$TASK      */
=1      $SAVE NOLIST
=
=       $INCLUDE (:F0:NGTTKP.EXT)          /* RQ$GET$TASK$TOKENS    */
=1      $SAVE NOLIST
=
=       $INCLUDE (:F0:NGTTOK.EXT)          /* RQ$GET$TYPE           */
=1      $SAVE NOLIST
=
=       $INCLUDE (:F0:NLUOBJ.EXT)          /* RQ$LOOKUP$OBJECT      */
=1      $SAVE NOLIST
=
=       $INCLUDE (:F0:NRCCTL.EXT)          /* RQ$RECEIVE$CONTROL    */
=1      $SAVE NOLIST
=
=       $INCLUDE (:F0:NRCMES.EXT)          /* RQ$RECEIVE$MESSAGE    */
=1      $SAVE NOLIST
=
=       $INCLUDE (:F0:NRCUNI.EXT)          /* RQ$RECEIVE$UNITS      */
=1      $SAVE NOLIST
=
=       $INCLUDE (:F0:NSNCTL.EXT)          /* RQ$SEND$CONTROL       */
=1      $SAVE NOLIST
=
=       $INCLUDE (:F0:NSNMES.EXT)          /* RQ$SEND$MESSAGE       */
=1      $SAVE NOLIST
=
=       $INCLUDE (:F0:NSNUNI.EXT)          /* RQ$SEND$UNITS         */
=1      $SAVE NOLIST
=
=       $INCLUDE (:F0:NSTEXH.EXT)          /* RQ$SET$EXCEPT$HDLR    */
=1      $SAVE NOLIST
=
=       $INCLUDE (:F0:NSTINT.EXT)          /* RQ$SET$INTERRUPT      */
=1      $SAVE NOLIST
=
=       $INCLUDE (:F0:NSGINT.EXT)          /* RQ$SIGNAL$INTERRUPT   */
=1      $SAVE NOLIST
=
=       $INCLUDE (:F0:NEXINT.EXT)          /* RQ$EXIT$INTERRUPT     */
=1      $SAVE NOLIST
=
=       $INCLUDE (:F0:NSLEEP.EXT)          /* RQ$SLEEP              */
=1      $SAVE NOLIST
=
=       $INCLUDE (:F0:NSUTSK.EXT)          /* RQ$SUSPEND$TASK       */
```

```
   =1   $SAVE NOLIST
    =                                          /* RQ$UNCATALOG$OBJECT */
    =    $INCLUDE (:F0:NUCOBJ.EXT)
   =1   $SAVE NOLIST
    =                                          /* RQ$WAIT$INTERRUPT   */
    =    $INCLUDE (:F0:NWTINT.EXT)
   =1   $SAVE NOLIST
        $EJECT
        /*
        ----------------------------------
        EXTERNAL PROCEDURES TO BE CREATED
        ----------------------------------
        */
86  1   COUNTN: PROCEDURE EXTERNAL;
87  2       END COUNTN;

88  1   COUNTO: PROCEDURE EXTERNAL;
89  2       END COUNTO;

90  1   SPDREG: PROCEDURE EXTERNAL;
91  2       END SPDREG;

92  1   ALGOUT: PROCEDURE EXTERNAL;
93  2       END ALGOUT;
        $EJECT
        /*
        ----------
        VARIABLES
        ----------
        */
94  1   DECLARE EH$STRUC STRUCTURE (PROC$ADDR POINTER,
                                    MODE      BYTE) DATA(8E$H,3);

95  1   DECLARE (N,STATUS)          WORD;

96  1   DECLARE (COUNTN$TASK$TOKEN,
                 COUNTO$TASK$TOKEN,
                 SPDREG$TASK$TOKEN,
                 ALGOUT$TASK$TOKEN,
                 OWN$JOB$TOKEN,
                 SPEED$REGION$TOKEN,
                 SLOPE$REGION$TOKEN,
                 MODEL$REGION$TOKEN)    TOKEN;
        /*
        ----------------------------------------
        MISCELLANEOUS REAL PUBLIC DATA DEFINITIONS
        ----------------------------------------
        */
97  1   DECLARE FP$DA$REQUEST       REAL  PUBLIC;
        /*
        --------------------------------
        REGION PUBLIC DATA DEFINITIONS
        --------------------------------
        */
        /* ----------- SLOPE REGION DATA ------------ */
```

```
78    1          DECLARE FP$SLOPE$ARRAY(10)      REAL    PUBLIC;

/* ----------- SPEED REGION DATA ------------ */

99    1          DECLARE FP$SLOPE                REAL PUBLIC DATA (2.0);
100   1          DECLARE FP$OFFSET               REAL PUBLIC DATA (300.0);

101   1          DECLARE (FP$DA,
                         FP$MACHINE$SPEED,
                         FP$SPEED$REQUEST,
                         FP$FILTER$ACCUMULATOR$LEVEL,
                         FP$CONT$FILL$LEVEL)     REAL    PUBLIC;

/* ----------- MODEL REGION DATA ------------ */

102   1          DECLARE FLOAT$ACC(500)          BYTE    PUBLIC;
103   1          DECLARE CONT$FILL$LEVEL         WORD    PUBLIC;
104   1          DECLARE MAX$NUMBER$ELEMENTS     WORD    PUBLIC;
                 /*
                 ----------------
                 SYSTEM CONSTANTS
                 ----------------
                 */
                 $EJECT
                 /*
                 --------------------------
                 ACCUMULATOR MODEL CONSTANTS
                 --------------------------
                 */
105   1          DECLARE FP$ACCUMULATOR$DELAY    REAL PUBLIC DATA (3.5);    /* 3.5 SECONDS HI SENSOR TO LOW SENSOR
106   1          DECLARE FP$TIME$RESOLUTION      REAL PUBLIC DATA (0.020);  /* UPDATE MODEL EVERY 20 MSEC */
107   1          DECLARE FP$MAX$ACCUMULATOR$FILL REAL PUBLIC DATA (114.0);  /* MAXIMUM NUMBER OF PARTS BETWEEN HOI
                     -SORS */

108   1          DECLARE FP$MINIMUM$SPEED        REAL PUBLIC DATA (100.0);
109   1          DECLARE FP$MAXIMUM$SPEED        REAL PUBLIC DATA (1450.0);
110   1          DECLARE FP$SECONDS$ACC          REAL PUBLIC DATA (4.0);

111   1          DECLARE FP$ACCUMULATOR$LENGTH   REAL PUBLIC DATA (40.0);   /* 40 FOOT CONVEYOR */
112   1          DECLARE PULSES$PER$UNIT$LENGTH  WORD PUBLIC DATA (10);     /* 10 PULSES PER FOOT */

/*
                 -----------------------------
                 COMMON ERROR HANDLING PROCEDURE
                 -----------------------------
                 */
113   1          E$H: PROCEDURE (C$CODE,PARAM,R1,R2) PUBLIC;
114   2              DECLARE (C$CODE,R1,R2) WORD;
115   2              DECLARE PARAM BYTE;

116   2              STATUS = C$CODE;
117   2          END;

$EJECT
```

```
/*
=============
INITIALIZATION
=============
*/
118   1   INITAL: PROCEDURE PUBLIC;
          /*
          ------------------------------------------------
          NOW SET THE EXCEPTION HANDLER FOR THIS TASK
          ------------------------------------------------
          */
117   2   CALL RQ$SET$EXCEPTION$HANDLER (@EH$STRUC,@STATUS);
          /*
          ------------------------------------------------
          SET UP 8255 ON iSBC 86/30
          ------------------------------------------------
          */
120   2       OUTPUT(PPI$0$CONT) = 10011001B;   /* MODE 0,PORT A INPUT,PORT B OUTPUT,
                                                   PORT C INPUT  */
          /*
          ------------------------------------------------
          TURN OFF ALL OUTPUTS
          ------------------------------------------------
          */
121   2       OUTPUT(PPI$0$PORT2) = 0FFH;       /* ACTUAL OUTPUT SENSE IS INVERTED */
          /*
          ------------------------------------------------
          INITIALIZE CONSTANTS
          ------------------------------------------------
          */
              /* FOR A FREE FALL OR CONSTANT VELOCITY PART MOVEMENT MODEL */

122   2       MAX$NUMBER$ELEMENTS = UNSIGN(FIX(FP$ACCUMULATOR$DELAY/FP$TIME$RESOLUTION));

/* FOR A VARIABLE SPEED CONVEYOR WITH PULSE TACHOMETER
                 INDICATION OF PART MOVEMENT - NOT USED IN THIS APPLICATION!

MAX$NUMBER$ELEMENTS = UNSIGN(FIX(FP$ACCUMULATOR$LENGTH)) *
                                       PULSES$PER$UNIT$LENGTH;
              */
          /*
          ------------------------------------------------
          INITIALIZE SOME OTHER IMPORTANT DATA
          ------------------------------------------------
          */
123   2       FP$DA,FP$MACHINE$SPEED,FP$SPEED$REQUEST,
              FP$FILTER$ACCUMULATOR$LEVEL,FP$CONT$FILL$LEVEL     = 0.0;

124   2       DO N = 0 TO LAST(FLOAT$ACC);
125   3           FLOAT$ACC(N) = 0;
126   3       END;

127   2       CONT$FILL$LEVEL     = 0;
          $EJECT
```

```
/*
        --------------
        CREATE REGIONS
        --------------
*/
128  2   SPEED$REGION$TOKEN     = RQ$CREATE$REGION(PRIORITY$QUEUE, /* PRIORITY */
                                                   @STATUS);

129  2   SLOPE$REGION$TOKEN     = RQ$CREATE$REGION(PRIORITY$QUEUE, /* PRIORITY */
                                                   @STATUS);

130  2   MODEL$REGION$TOKEN     = RQ$CREATE$REGION(PRIORITY$QUEUE, /* PRIORITY */
                                                   @STATUS);
/*
        ------------
        CREATE TASKS
        ------------
*/
131  2   COUNTN$TASK$TOKEN = RQ$CREATE$TASK( 98,            /* PRIORITY (INT-M5)*/
                                             @COUNTN,       /* START ADDRESS    */
                                             0,             /* DATA SEGMENT     */
                                             0,             /* STACK POINTER    */
                                             512,           /* STACK SIZE       */
                                             1,             /* TASK FLAGS       */
                                             @STATUS);

132  2   COUNTO$TASK$TOKEN = RQ$CREATE$TASK( 82,            /* PRIORITY (INT-M4)*/
                                             @COUNTO,       /* START ADDRESS    */
                                             0,             /* DATA SEGMENT     */
                                             0,             /* STACK POINTER    */
                                             1024,          /* STACK SIZE       */
                                             1,             /* TASK FLAGS       */
                                             @STATUS);

133  2   SPDRED$TASK$TOKEN = RQ$CREATE$TASK( 131,           /* PRIORITY         */
                                             @SPDRED,       /* START ADDRESS    */
                                             0,             /* DATA SEGMENT     */
                                             0,             /* STACK POINTER    */
                                             512,           /* STACK SIZE       */
                                             1,             /* TASK FLAGS       */
                                             @STATUS);

134  2   ALGOUT$TASK$TOKEN = RQ$CREATE$TASK( 132,           /* PRIORITY         */
                                             @ALGOUT,       /* START ADDRESS    */
                                             0,             /* DATA SEGMENT     */
                                             0,             /* STACK POINTER    */
                                             512,           /* STACK SIZE       */
                                             1,             /* TASK FLAGS       */
                                             @STATUS);
         $EJECT
/*
        ----------------
        OBTAIN JOB TOKENS
        ----------------
*/
```

```
135   2         OWN$JOB$TOKEN = RQ$GET$TASK$TOKENS (1,@STATUS);

/*
              ------------------------------------------------
              CATALOG WITH USER JOB ALL GLOBAL OBJECTS
              ------------------------------------------------
          */
136   2         CALL RQ$CATALOG$OBJECT (OWN$JOB$TOKEN,         /* THIS JOB  */
                                        SPEED$REGION$TOKEN,    /* OBJECT    */
                                        @(9,'SPEED$RGN'),      /* NAME      */
                                        @STATUS);

137   2         CALL RQ$CATALOG$OBJECT (OWN$JOB$TOKEN,         /* THIS JOB  */
                                        SLOPE$REGION$TOKEN,    /* OBJECT    */
                                        @(9,'SLOPE$RGN'),      /* NAME      */
                                        @STATUS);

138   2         CALL RQ$CATALOG$OBJECT (OWN$JOB$TOKEN,         /* THIS JOB  */
                                        MODEL$REGION$TOKEN,    /* OBJECT    */
                                        @(9,'MODEL$RGN'),      /* NAME      */
                                        @STATUS);

139   2         CALL RQ$CATALOG$OBJECT (OWN$JOB$TOKEN,         /* THIS JOB  */
                                        COUNTN$TASK$TOKEN,     /* OBJECT    */
                                        @(10,'COUNTN$TSK'),    /* NAME      */
                                        @STATUS);

140   2         CALL RQ$CATALOG$OBJECT (OWN$JOB$TOKEN,         /* THIS JOB  */
                                        COUNTO$TASK$TOKEN,     /* OBJECT    */
                                        @(10,'COUNTO$TSK'),    /* NAME      */
                                        @STATUS);

141   2         CALL RQ$CATALOG$OBJECT (OWN$JOB$TOKEN,         /* THIS JOB  */
                                        SPDREG$TASK$TOKEN,     /* OBJECT    */
                                        @(10,'SPDREG$TSK'),    /* NAME      */
                                        @STATUS);

142   2         CALL RQ$CATALOG$OBJECT (OWN$JOB$TOKEN,         /* THIS JOB  */
                                        ALGOUT$TASK$TOKEN,     /* OBJECT    */
                                        @(10,'ALGOUT$TSK'),    /* NAME      */
                                        @STATUS);
          $EJECT
          /*
              ------------------------------------------------
              HANDLE THE DIGITAL INPUT AND OUTPUT FOR THIS JOB
              ------------------------------------------------
          */
143   2         DO FOREVER;

144   3            CALL RQ$SUSPEND$TASK (0,@STATUS);  /* SUSPEND THIS TASK */

145   3         END;
146   2      END INITAL;
147   1   END;
```

MODULE INFORMATION:

CODE AREA SIZE     = 0225H    549D
    CONSTANT AREA SIZE = 0077H    121D
    VARIABLE AREA SIZE = 024CH    588D
    MAXIMUM STACK SIZE = 001CH     28D
    792 LINES READ
    0 PROGRAM WARNINGS
    0 PROGRAM ERRORS

DICTIONARY SUMMARY:

667KB MEMORY AVAILABLE
    19KB MEMORY USED   (1%)
    0KB DISK SPACE USED

END OF PL/M-86 COMPILATION

SERIES-III PL/M-86 V2.3 COMPILATION OF MODULE COUNTN
OBJECT MODULE PLACED IN :F4:COUNTN.OBJ
COMPILER INVOKED BY: PLM86.86 :F4:COUNTN.P86

```
        $DEBUG LARGE ROM
        $OPTIMIZE(3)
        $TITLE('TASK - COUNT IN')
        /*

==========================================
                TASK COUNTN - DETECT PARTS ENTERING THE
                            ACCUMULATOR

COPYRIGHT ADOLPH COORS CO.
                               GOLDEN, COLORADO 80401
                               SEPTEMBER 13,1984
                ==========================================
        */
        COUNTN: DO;
        /*
        ****************************************************************
        #
        #PRIORITY 98    INTERRUPT LEVEL 5
        #
        #RECEIVES: MESSAGE----------FROM-----------VIA--------COMMENTS
        #          INTERRUPT #5   COUNT-IN SENSOR      INCOMING PART TO ACCUMULATOR
        #
        #SENDS:    MESSAGE----------TO-----------VIA--------COMMENTS
        #          NONE
        #
        #USES PUBLIC PROCEDURES:
        #READS PUBLIC DATA:
        #WRITES PUBLIC DATA:FLOAT$ACC(ACCUMULATOR$DELAY/TIME$RESOLUTION)
        #
        #FUNCTION: HANDLES THE INTERRUPT FOR PARTS ENTERING THE ACCUMULATOR. THIS IS THE
        #          INPUT TO THE ACCUMULATOR MODEL. (SEE TASK SPDREG FOR THE ACCUMULATOR MODEL).
```

```

#OPERATION: 1) WAIT FOR A PART TO ENTER THE ACCUMULATOR (INTERRUPT H5 TRIGGERS THE
#             SOFTWARE).

#          2) GET ACCESS TO THE MODEL$REGION.

#          3) UPDATE THE LAST FLOAT$ACC ARRAY ELEMENT. THE LAST ELEMENT
#             REPRESENTS THE INPUT OF THE ACCUMULATOR.

#          4) RELINQUISH ACCESS TO THE MODEL$REGION.

#          5) GO TO 1 ABOVE.
#***************************************************************************/
$EJECT

/*

***************************REVISION INSTRUCTIONS*********************

WHEN REVISING THIS MODULE PLEASE ADD THE FOLLOWING
INFORMATION TO THIS FILE IN ADDITION TO REVISING
THE MASTER REVISION LIST (MSTREV.TXT).

1.  DATE OF REVISION AND REVISION LETTER.
   2.  A FULL DESCRIPTION OF THE REVISION.
   3.  A LIST OF OTHER MODULES AFFECTED AS A
       DIRECT RESULT OF THIS REVISION.

WITHIN THIS FILE INCLUDE THE REVISION LETTER AT THE
END OF EACH LINE ADDED OR MODIFIED AND IMMEDIATELY
PRIOR TO THE LOCATION FROM WHICH A LINE WAS REMOVED.

************************ REVISION STATUS **************************

ORIGINAL PROGRAM DATE  9/13/84
              PROGRAMMER - ROGER THOMPSON
                       OTHER
                       MODULES
REVISION      DATE     AFFECTED         DESCRIPTION
--------      ----     --------         -----------

*/
$EJECT
/*
============
DECLARATIONS
============
```

```
            */
            $INCLUDE (:F4:COMMON.LIT)
      =     /*
      =     ================
      =       COMMON.LIT
      =     ================
      =     */
      =     /* THESE ARE DECLARATIONS THAT WILL BE COMMON TO ALL PROGRAMS */

2   1 =     DECLARE TOKEN                 LITERALLY 'SELECTOR',
      =             WAIT$INDEFINITELY     LITERALLY 'OFFFFH',
      =             FOREVER               LITERALLY 'WHILE 1',
      =             FIFO                  LITERALLY '0',
      =             FIFO$8                LITERALLY '4',
      =             PRIORITY$QUEUE        LITERALLY '1';

3   1 =     DECLARE TRUE                  LITERALLY 'OFFH',
      =             FALSE                 LITERALLY '0',
      =             ON                    LITERALLY '1',
      =             OFF                   LITERALLY '0',
      =             AUTO                  LITERALLY '0',
      =             COVERED               LITERALLY '1',
      =             CLEAR                 LITERALLY '0',
      =             RUN                   LITERALLY '1',
      =             STOP                  LITERALLY '0',
      =             DOWN                  LITERALLY '0',
      =             UP                    LITERALLY '1',
      =             JOG                   LITERALLY '0',
      =             FULL                  LITERALLY '1',
      =             NOT$FULL              LITERALLY '0',
      =             ENABLED               LITERALLY '1',
      =             DISABLED              LITERALLY '0';
            $EJECT
            /*
            ----------------------
            RMX85 NUCLEUS LITERALS
            ----------------------
            */
            $INCLUDE (:F4:RMXMDS.EXT)
      =                                                     /* RQ$CATALOG$OBJECT    */
      =     $INCLUDE (:F0:NCTOBJ.EXT)
     =1     $SAVE NOLIST
      =                                                     /* RQ$CREATE$MAILBOX    */
      =     $INCLUDE (:F0:NCRMBX.EXT)
     =1     $SAVE NOLIST
      =                                                     /* RQ$CREATE$REGION     */
      =     $INCLUDE (:F0:NCRREG.EXT)
     =1     $SAVE NOLIST
      =                                                     /* RQ$CREATE$SEGMENT    */
      =     $INCLUDE (:F0:NCRSEG.EXT)
     =1     $SAVE NOLIST
      =                                                     /* RQ$CREATE$SEMAPHORE  */
      =     $INCLUDE (:F0:NCRSEM.EXT)
     =1     $SAVE NOLIST
      =                                                     /* RQ$CREATE$TASK       */
      =     $INCLUDE (:F0:NCRTSK.EXT)
```

```
=1   $SAVE NOLIST
=                                        /* RQ$DELETE$SEGMENT    */
=    $INCLUDE (:F0:NDLSEG.EXT)
=1   $SAVE NOLIST
=                                        /* RQ$DELETE$TASK       */
=    $INCLUDE (:F0:NDLTSK.EXT)
=1   $SAVE NOLIST
=                                        /* RQ$END$INIT$TASK     */
=    $INCLUDE (:F0:NEINIT.EXT)
=1   $SAVE NOLIST
=                                        /* RQ$GET$TASK$TOKENS   */
=    $INCLUDE (:F0:NGTTYP.EXT)
=1   $SAVE NOLIST
=                                        /* RQ$GET$TYPE          */
=    $INCLUDE (:F0:NGTTOK.EXT)
=1   $SAVE NOLIST
=                                        /* RQ$LOOK$UP$OBJECT    */
=    $INCLUDE (:F0:NLUOBJ.EXT)
=1   $SAVE NOLIST
=                                        /* RQ$RECEIVE$CONTROL   */
=    $INCLUDE (:F0:NRCCTL.EXT)
=1   $SAVE NOLIST
=                                        /* RQ$RECEIVE$MESSAGE   */
=    $INCLUDE (:F0:NRCMES.EXT)
=1   $SAVE NOLIST
=                                        /* RQ$RECEIVE$UNITS     */
=    $INCLUDE (:F0:NRCUNI.EXT)
=1   $SAVE NOLIST
=                                        /* RQ$SEND$CONTROL      */
=    $INCLUDE (:F0:NSNCTL.EXT)
=1   $SAVE NOLIST
=                                        /* RQ$SEND$MESSAGE      */
=    $INCLUDE (:F0:NSNMES.EXT)
=1   $SAVE NOLIST
=                                        /* RQ$SEND$UNITS        */
=    $INCLUDE (:F0:NSNUNI.EXT)
=1   $SAVE NOLIST
=                                        /* RQ$SET$EXCEPT$HDLR   */
=    $INCLUDE (:F0:NSTEXH.EXT)
=1   $SAVE NOLIST
=                                        /* RQ$SET$INTERRUPT     */
=    $INCLUDE (:F0:NSTINT.EXT)
=1   $SAVE NOLIST
=                                        /* RQ$SIGNAL$INTERRUPT  */
=    $INCLUDE (:F0:NSGINT.EXT)
=1   $SAVE NOLIST
=                                        /* RQ$EXIT$INTERRUPT    */
=    $INCLUDE (:F0:NEXINT.EXT)
=1   $SAVE NOLIST
=                                        /* RQ$SLEEP             */
=    $INCLUDE (:F0:NSLEEP.EXT)
=1   $SAVE NOLIST
=                                        /* RQ$SUSPEND$TASK      */
=    $INCLUDE (:F0:NSUTSK.EXT)
=1   $SAVE NOLIST
```

```
         =                                    /* RQ$UNCATALOG$OBJECT  */
         =   $INCLUDE (:F0:NUCOBJ.EXT)
         =1  $SAVE NOLIST
         =                                    /* RQ$WAIT$INTERRUPT    */
         =   $INCLUDE (:F0:NWTINT.EXT)
         =1  $SAVE NOLIST
             $EJECT
             /*
             -------------
             OBJECT TOKENS
             -------------
             */
81   1      DECLARE (OWN$JOB$TOKEN,
                     MODEL$RGN)          TOKEN;
             /*
             ---------
             VARIABLES
             ---------
             */
82   1          DECLARE (N,K,STATUS)          WORD;

83   1          DECLARE MAX$NUMBER$ELEMENTS   WORD   EXTERNAL;

84   1          DECLARE FLOAT$ACC(500)        BYTE   EXTERNAL;

/* ================================================================
                INTERRUPT LEVEL 58H HANDLER (MASTER LEVEL 5)
                ---------------------------------------------------------------- */
85   1          COUNTN$INT$HANDLER: PROCEDURE   INTERRUPT 58H;

86   2          DECLARE STATUS          WORD;

87   2              CALL RQ$SIGNAL$INTERRUPT (58H,@STATUS);

88   2          END COUNTN$INT$HANDLER;
             /* ================================================================ */
             $EJECT 89   1      COUNTN: PROCEDURE PUBLIC;
             /*
             ==============
             INITIALIZATION
             ==============
             */
90   2      N = MAX$NUMBER$ELEMENTS;    /* TRANSFER THE MAXIMUM NUMBER OF FLOAT$ACC
                                           ELEMENTS TO A LOCAL VARIABLE */
             /*
             --------------------------------
             LOOKUP PREVIOUSLY CATALOGED OBJECTS
             --------------------------------
             */
91   2      OWN$JOB$TOKEN = RQ$GET$TASK$TOKENS (1,@STATUS);

92   2      MODEL$RGN  = RQ$LOOKUP$OBJECT (OWN$JOB$TOKEN,         /* MODEL REGION */
                                           @(9,'MODEL$RGN'),
                                           WAIT$INDEFINITELY,
```

```
                                                @STATUS);

93  2       CALL RQ$SET$INTERRUPT (58H,           /* ENABLE PART INPUT DETECTION */
                                    100,          /* STACK 100 PENDING INTERRUPTS */
                                    INTERRUPT$PTR(COUNTN$INT$HANDLER),
                                    0,
                                    @STATUS);

/*
            =========
            MAIN LOOP
            =========
            */
94  2       DO FOREVER;

95  3           CALL RQ$WAIT$INTERRUPT (58H,@STATUS);   /* WAIT FOR PART ENTERING ACCUMULATOR */

96  3           CALL RQ$RECEIVE$CONTROL (MODEL$RGN,@STATUS);
97  3           FLOAT$ACC(N)   = FLOAT$ACC(N) + 1;   /* UPDATE THE ACCUMULATOR MODEL INPUT ARRAY ELE*
98  3           CALL RQ$SEND$CONTROL (@STATUS);

99  3       END;

100 2    END COUNTN;
101 1 END;
```

MODULE INFORMATION:

```
    CODE AREA SIZE     = 00B7H    183D
    CONSTANT AREA SIZE = 0012H     18D
    VARIABLE AREA SIZE = 000CH     12D
    MAXIMUM STACK SIZE = 002AH     42D
    575 LINES READ
    0 PROGRAM WARNINGS
    0 PROGRAM ERRORS
```

DICTIONARY SUMMARY:
      KB
    669KB MEMORY AVAILABLE
    8KB MEMORY USED   (1%)
    0KB DISK SPACE USED

END OF PL/M-86 COMPILATION

```
        $DEBUG LARGE ROM
        $OPTIMIZE(3)
        $TITLE('TASK COUNT OUT')
        /*
            =============================================
            TASK COUNTO - DETECT PARTS LEAVING THE
                          ACCUMULATOR

COPYRIGHT ADOLPH COORS CO.
                      GOLDEN, COLORADO 80401
                      SEPTEMBER 13, 1984
            =============================================
```

```
*/
COUNTO: DO;
/****************************************************************
*PRIORITY 82 (INTERRUPT LEVEL M4)
*
*RECEIVES:   MESSAGE----------FROM----------VIA----------COMMENTS
*            INTERRUPT M4  COUNT-OUT SENSOR              INTERRUPT FOR EVERY 1
*                                                        PART EXITING THE
*                                                        ACCUMULATOR
*
*SENDS:      MESSAGE----------TO------------VIA----------COMMENTS
*            NONE
*
*CALLS:      PROCEDURE-----LANGUAGE-----PARAMETERS PASSED-----DIRECTION
*
*USES PUBLIC PROCEDURES:
*READS/WRITES PUBLIC DATA:
*
*FUNCTION:
*OPERATION:  1) REQUIRED SYSTEM TOKENS ARE OBTAINED.
*
*            2) INTERRUPT LEVEL M4 IS ENABLED.
*
*            3) THE TASK WAITS FOR AN INTERRUPT.
*
*            4) WHEN AN INTERRUPT LEVEL M4 OCCURS (PART REMOVED FROM THE MACHINE)
*               THE INTERRUPT HANDLER (COUNTO$INT$HANDLER).
*
*            5) WAIT FOR A SIGNAL INTERRUPT FROM COUNTO$INT$HANDLER.
****************************************************************/
$EJECT

/*

*********************REVISION INSTRUCTIONS*********************

WHEN REVISING THIS MODULE PLEASE ADD THE FOLLOWING
INFORMATION TO THIS FILE IN ADDITION TO REVISING
THE MASTER REVISION LIST (MSTREV.TXT).

1.  DATE OF REVISION AND REVISION LETTER.
    2.  A FULL DESCRIPTION OF THE REVISION.
    3.  A LIST OF OTHER MODULES AFFECTED AS A
        DIRECT RESULT OF THIS REVISION.

WITHIN THIS FILE INCLUDE THE REVISION LETTER AT THE
END OF EACH LINE ADDED OR MODIFIED AND IMMEDIATELY
PRIOR TO THE LOCATION FROM WHICH A LINE WAS REMOVED.

********************** REVISION STATUS **********************
```

ORIGINAL PROGRAM DATE 9/13/84
PROGRAMMER - ROGER THOMPSON

| REVISION | DATE | OTHER MODULES AFFECTED | DESCRIPTION |
|----------|------|------------------------|-------------|
|          |      |                        |             |

```
          */
          $EJECT
          /*
          ============
          DECLARATIONS
          ============
          */
          $INCLUDE (:F4:COMMON.LIT)
     =    /*
     =    ================
     =       COMMON.LIT
     =    ================
     =    */
     =    /* THESE ARE DECLARATIONS THAT WILL BE COMMON TO ALL PROGRAMS */

2  1 =    DECLARE TOKEN              LITERALLY 'SELECTOR',
     =            WAIT$INDEFINITELY  LITERALLY 'OFFFFH',
     =            FOREVER            LITERALLY 'WHILE 1',
     =            FIFO               LITERALLY '0',
     =            FIFO$8             LITERALLY '4',
     =            PRIORITY$QUEUE     LITERALLY '1';

3  1 =    DECLARE TRUE               LITERALLY 'OFFH',
     =            FALSE              LITERALLY '0',
     =            ON                 LITERALLY '1',
     =            OFF                LITERALLY '0',
     =            AUTO               LITERALLY '0',
     =            COVERED            LITERALLY '1',
     =            CLEAR              LITERALLY '0',
     =            RUN                LITERALLY '1',
     =            STOP               LITERALLY '0',
     =            DOWN               LITERALLY '0',
     =            UP                 LITERALLY '1',
     =            JOG                LITERALLY '0',
     =            FULL               LITERALLY '1',
     =            NOT$FULL           LITERALLY '0',
     =            ENABLED            LITERALLY '1',
     =            DISABLED           LITERALLY '0';
          $EJECT
          /*
          -----------------------
          RMX86 NUCLEUS LITERALS
          -----------------------
          */
          $INCLUDE (:F4:RMXHDS.EXT)
```

```
=
=       $INCLUDE (:F0:NCTOBJ.EXT)           /* RQ$CATALOG$OBJECT        */
=1      $SAVE NOLIST
=
=       $INCLUDE (:F0:NCRMBX.EXT)           /* RQ$CREATE$MAILBOX        */
=1      $SAVE NOLIST
=
=       $INCLUDE (:F0:NCRREG.EXT)           /* RQ$CREATE$REGION         */
=1      $SAVE NOLIST
=
=       $INCLUDE (:F0:NCRSEG.EXT)           /* RQ$CREATE$SEGMENT        */
=1      $SAVE NOLIST
=
=       $INCLUDE (:F0:NCRSEM.EXT)           /* RQ$CREATE$SEMAPHORE      */
=1      $SAVE NOLIST
=
=       $INCLUDE (:F0:NCRTSK.EXT)           /* RQ$CREATE$TASK           */
=1      $SAVE NOLIST
=
=       $INCLUDE (:F0:NDLSEG.EXT)           /* RQ$DELETE$SEGMENT        */
=1      $SAVE NOLIST
=
=       $INCLUDE (:F0:NDLTSK.EXT)           /* RQ$DELETE$TASK           */
=1      $SAVE NOLIST
=
=       $INCLUDE (:F0:NEINIT.EXT)           /* RQ$END$INIT$TASK         */
=1      $SAVE NOLIST
=
=       $INCLUDE (:F0:NGTTTP.EXT)           /* RQ$GET$TASK$TOKENS       */
=1      $SAVE NOLIST
=
=       $INCLUDE (:F0:NGTTOK.EXT)           /* RQ$GET$TYPE              */
=1      $SAVE NOLIST
=
=       $INCLUDE (:F0:NLUOBJ.EXT)           /* RQ$LOOKUP$OBJECT         */
=1      $SAVE NOLIST
=
=       $INCLUDE (:F0:NRCCTL.EXT)           /* RQ$RECEIVE$CONTROL       */
=1      $SAVE NOLIST
=
=       $INCLUDE (:F0:NRCMES.EXT)           /* RQ$RECEIVE$MESSAGE       */
=1      $SAVE NOLIST
=
=       $INCLUDE (:F0:NRCUNI.EXT)           /* RQ$RECEIVE$UNITS         */
=1      $SAVE NOLIST
=
=       $INCLUDE (:F0:NSNCTL.EXT)           /* RQ$SEND$CONTROL          */
=1      $SAVE NOLIST
=
=       $INCLUDE (:F0:NSNMES.EXT)           /* RQ$SEND$MESSAGE          */
=1      $SAVE NOLIST
=
=       $INCLUDE (:F0:NSNUNI.EXT)           /* RQ$SEND$UNITS            */
=1      $SAVE NOLIST
=
=       $INCLUDE (:F0:NSTEXH.EXT)           /* RQ$SET$EXCEPT$HDLR       */
```

```
=1    $SAVE NOLIST
=                                           /* RQ$SET$INTERRUPT        */
=     $INCLUDE (:F0:NSTINT.EXT)
=1    $SAVE NOLIST
=                                           /* RQ$SIGNAL$INTERRUPT     */
=     $INCLUDE (:F0:NGGINT.EXT)
=1    $SAVE NOLIST
=                                           /* RQ$EXIT$INTERRUPT       */
=     $INCLUDE (:F0:NEXINT.EXT)
=1    $SAVE NOLIST
=                                           /* RQ$SLEEP                */
=     $INCLUDE (:F0:NSLEEP.EXT)
=1    $SAVE NOLIST
=                                           /* RQ$SUSPEND$TASK         */
=     $INCLUDE (:F0:NSUTSK.EXT)
=1    $SAVE NOLIST
=                                           /* RQ$UNCATALOG$OBJECT     */
=     $INCLUDE (:F0:NUCOBJ.EXT)
=1    $SAVE NOLIST
=                                           /* RQ$WAIT$INTERRUPT       */
=     $INCLUDE (:F0:NWTINT.EXT)
=1    $SAVE NOLIST
      $EJECT
      /*
      ----------
      VARIABLES
      ----------
      */
81 1  DECLARE (N,STATUS)            WORD;

82 1  DECLARE (INT$PER$PART,
              INT$COUNT)            INTEGER;

83 1  DECLARE CONT$FILL$LEVEL       WORD   EXTERNAL;

84 1  DECLARE (I$DIVIDE,
              I$PPR,
              I$SPEED$REQUEST,
              I$CONT$FILL$LEVEL)    INTEGER EXTERNAL;
      /*
      -------------
      OBJECT TOKENS
      -------------
      */
85 1  DECLARE (DUMMY,
              JHN$JOB$TOKEN,
              SPEED$RON,
              MODEL$RON)            TOKEN;
      /*
      --------------------
      INTERNAL PROCEDURES
      --------------------
      */
      /* ==============================================================
         INTERRUPT LEVEL 48H HANDLER (MASTER LEVEL 4)
         ============================================================== */
```

```
86  1    COUNT0$INT$HANDLER: PROCEDURE   INTERRUPT 48H;

87  2       DECLARE STATUS  WORD;

88  2          CALL RQ$SIGNAL$INTERRUPT (48H,@STATUS);

89  2       END COUNT0$INT$HANDLER;
            /* ================================================================ */
            $EJECT 90  1    COUNT0: PROCEDURE PUBLIC;
         /*
         ==============
         INITIALIZATION
         ==============
         */
91  2       OWN$JOB$TOKEN = RQ$GET$TASK$TOKENS (1,@STATUS);

92  2       MODEL$RGN    = RQ$LOOKUP$OBJECT (OWN$JOB$TOKEN,         /* MODEL REGION */
                                             @(9,'MODEL$RGN'),
                                             WAIT$INDEFINITELY,
                                             @STATUS);
93  2       CALL RQ$SET$INTERRUPT   (48H,
                                     1,
                                     INTERRUPT$PTR(COUNT0$INT$HANDLER),
                                     0,
                                     @STATUS);          /* ENABLE PART OUTPUT DETECTION */
         /*
         =========
         MAIN LOOP
         =========
         */
94  2       DO FOREVER;

95  3          CALL RQ$WAIT$INTERRUPT (48H,@STATUS);  /* WAIT FOR A PART TO EXIT
                                                         THE ACCUMULATOR */
            /*
            ------------------------------
            CONTINUOUS FILL LEVEL UPDATE
            (SUBTRACT A PART)
            ------------------------------
            */
96  3          CALL RQ$RECEIVE$CONTROL (MODEL$RGN,@STATUS);
97  3          IF CONT$FILL$LEVEL > 0 THEN
98  3          CONT$FILL$LEVEL = CONT$FILL$LEVEL - 1;
99  3          CALL RQ$SEND$CONTROL (@STATUS);

100 3       END;
101 2    END COUNT0;
102 1    END;

MODULE INFORMATION:

CODE AREA SIZE    = 00AEH    174D
```

```
CONSTANT AREA SIZE = 000EH      14D
VARIABLE AREA SIZE = 0012H      18D
MAXIMUM STACK SIZE = 002AH      42D
384 LINES READ
0 PROGRAM WARNINGS
0 PROGRAM ERRORS

DICTIONARY SUMMARY:

667KB MEMORY AVAILABLE
    8KB MEMORY USED  (1%)
    0KB DISK SPACE USED

END OF PL/M-86 COMPILATION
SERIES-III PL/M-86 V2.0 COMPILATION OF MODULE SPDREG
OBJECT MODULE PLACED IN :F4:SPDREG.OBJ
COMPILER INVOKED BY:  PLM86.86 :F4:SPDREG.P86

$DEBUG LARGE ROM
            $OPTIMIZE(3)
            $TITLE('TASK - SPEED REGULATOR')
            /*
               ================================================
               TASK SPDREG -  UPDATES ACCUMULATOR MODEL
                              AND CALCULATES PROPORTIONAL
                              CONTROL FOR THE DOWNSTREAM
                              MACHINE

COPYRIGHT ADOLPH COORS CO.
                                  GOLDEN, COLORADO 80401
                                  SEPTEMBER 21, 1984
               ================================================
            */
       1    SPDREG: DO;
            /*
            ********************************************************************
            *
            *PRIORITY 131
            *
            *RECEIVES: MESSAGE----------FROM-----------VIA---------COMMENTS
            *          TIME$OUT                        WAIT        THIS TASK RUNS ONCE
            *                                                      EVERY 20 MSEC UPDATING
            *                                                      THE ACCUMULATOR FILL LEVEL
            *                                                      MODEL AND THE MACHINE
            *                                                      SPEED REQUEST
            *
            *SENDS:    MESSAGE----------TO-------------VIA---------COMMENTS
            *
            *USES PUBLIC PROCEDURES:
            *READS PUBLIC DATA: CONT$FILL$LEVEL,FLOAT$ACC(N)
            *WRITES PUBLIC DATA: CONT$FILL$LEVEL,FLOAT$ACC(N),SPEED$REQUEST
            *
            *FUNCTION: TO CONTROL THE SPEED OF THE MACHINE TO MATCH THE LOAD REQUIREMENTS
            *          (PART INPUT) PRESENTED BY THE UPSTREAM PROCESS.
```

```
*
*       THIS TASK RUNS PERIODICALLY UPDATING THE ACCUMULATOR MODEL. THE ACCUMULATOR
*       MODEL ACCOUNTS FOR THE FLOATING ACCUMULATION AND CONTINUOUS FILL
*       LEVELS IN THE GRAVITY STYLE PART ACCUMULATOR USING APRIORI INFORMATION
*       ABOUT THE CHARACTERISTIC OF THE ACCUMULATOR. THE REQUIRED MACHINE SPEED
*       TO MAINTAIN A FIXED AMOUNT OF TIME (NOT ACCUMULATION) IN THE ACCUMULATOR
*       IS THEN DETERMINED BASED ON THE CONTINUOUS FILL LEVEL CALCULATION.
*       THIS ALLOWS FOR OPTIMUM MACHINE RESPONSE TO LOAD FLUCTUATIONS.
*
$EJECT
*
*OPERATION:
*
*                 =======================================
*                 =          ACCUMULATOR MODEL          =
*                 =======================================
*
* PART FLOW -----)  -----)  -----)  -----)  -----)  -----)  -----)  -----)
*
*              FLOAT$ACC(K-J)   (------- --------)  CONT$FILL$LEVEL
* UPSTREAM    _ _ _ _ _ _ _ _ _ _ _ _ _|_ _ _ _ _ _ _ _ _ _ _ _ _ _   DOWNSTREAM
* MACHINE    !_!_!_!_!_!_!_!_!_!_!_!_!_!_!_!_!_!_!_!_!_!_!_!_!_!_!   MACHINE
*             ^ ^                       |                         ^
*             | FLOAT$ACC(K-1)                                    FLOAT$ACC(0)
*             |
*             FLOAT$ACC(K)
*
*   K - TOTAL NUMBER OF SLOTS IN ACCUMULATOR MODEL (RESOLUTION)
*   J - NUMBER OF SLOTS TO BE INCLUDED IN THE CONTINUOUS FILL LEVEL
*
*INITIALIZATION:
*
*    THE ACCUMULATOR MODEL RESOLUTION IS DETERMINED AT TASK INITIALIZATION. THE
*    RESOLUTION IS A FUNCTION OF HOW OFTEN THIS TASK RUNS (MODEL UPDATE
*    FREQUENCY) AND THE CHARACTERISTIC PART TRANSIT TIME THRU THE ACCUMULATOR (ACCUMULATOR
*    DELAY).
*
*MAIN LOOP:
*
*    1) DETERMINE HOW MUCH OF THE FLOATING ACCUMULATION IS TO BE INCLUDED
*       IN THE CONTINUOUS FILL LEVEL.
*
*    2) UPDATE THE CONTINUOUS FILL LEVEL TO REFLECT THE PRESENT ACCUMULATOR
*       CONDITION.
*
*    3) MOVE THE PARTS THRU THE ACCUMULATOR MODEL (FLOATING ACCUMULATION ARRAY)
*
*    4) MAKE A ROUGH VERIFICATION OF THE ACCUMULATOR MODEL CALCULATION AGAINST
*       THE ACCUMULATOR LEVEL SENSORS.
*
*    5) CALCULATE THE REQUIRED MACHINE SPEED TO MAINTAIN A FIXED NUMBER OF
*       SECONDS OF PARTS IN THE ACCUMULATOR.
*
***********************************************************************
*/
$EJECT
/*
```

************************REVISION INSTRUCTIONS********************

WHEN REVISING THIS MODULE PLEASE ADD THE FOLLOWING
INFORMATION TO THIS FILE IN ADDITION TO REVISING
THE MASTER REVISION LIST (MSTREV.TXT).

1. DATE OF REVISION AND REVISION LETTER.
   2. A FULL DESCRIPTION OF THE REVISION.
   3. A LIST OF OTHER MODULES AFFECTED AS A
      DIRECT RESULT OF THIS REVISION.

WITHIN THIS FILE INCLUDE THE REVISION LETTER AT THE
END OF EACH LINE ADDED OR MODIFIED AND IMMEDIATELY
PRIOR TO THE LOCATION FROM WHICH A LINE WAS REMOVED.

************************ REVISION STATUS ************************

ORIGINAL PROGRAM DATE  9/21/84
                   PROGRAMMER - ROGER THOMPSON

OTHER
                            MODULES
        REVISION    DATE    AFFECTED     ENGINEER    DESCRIPTION
        --------    ----    --------     --------    -----------

```
     */
     $EJECT
     /*
     ============
     DECLARATIONS
     ============
     */
     /*
     -------------------
     EXTERNAL PROCEDURES
     -------------------
     */
2  1  E$H: PROCEDURE (C$CODE,PARAM,R1,R2) EXTERNAL;
3  2     DECLARE (C$CODE,R1,R2) WORD;
4  2     DECLARE PARAM BYTE;
5  2  END E$H;
     /*
     --------
     LITERALS
     --------
     */
     $INCLUDE (:F4:COMMON.LIT)
=    /*
```

```
=        ================
=           COMMON.LIT
=        ================
=        */
=        /* THESE ARE DECLARATIONS THAT WILL BE COMMON TO ALL PROGRAMS */

6  1.=   DECLARE TOKEN               LITERALLY 'SELECTOR',
   =            WAIT$INDEFINITELY    LITERALLY '0FFFFH',
   =            FOREVER              LITERALLY 'WHILE 1',
   =            FIFO                 LITERALLY '0',
   =            FIFO$B               LITERALLY '4',
   =            PRIORITY$QUEUE       LITERALLY '1';

7  1 =   DECLARE TRUE                LITERALLY '0FFH',
   =            FALSE                LITERALLY '0',
   =            ON                   LITERALLY '1',
   =            OFF                  LITERALLY '0',
   =            AUTO                 LITERALLY '0',
   =            COVERED              LITERALLY '1',
   =            CLEAR                LITERALLY '0',
   =            RUN                  LITERALLY '1',
   =            STOP                 LITERALLY '0',
   =            DOWN                 LITERALLY '0',
   =            UP                   LITERALLY '1',
   =            JOG                  LITERALLY '0',
   =            FULL                 LITERALLY '1',
   =            NOT$FULL             LITERALLY '0',
   =            ENABLED              LITERALLY '1',
   =            DISABLED             LITERALLY '0';
         $EJECT
         $INCLUDE (:F4:RMXMBS.EXT)
                                          /* RQ$CATALOG$OBJECT     */
  =      $INCLUDE (:F0:NCTOBJ.EXT)
  =1     $SAVE NOLIST
  =
                                          /* RQ$CREATE$MAILBOX     */
  =      $INCLUDE (:F0:NCRMBX.EXT)
  =1     $SAVE NOLIST
  =
                                          /* RQ$CREATE$REGION      */
  =      $INCLUDE (:F0:NCRREG.EXT)
  =1     $SAVE NOLIST
  =
                                          /* RQ$CREATE$SEGMENT     */
  =      $INCLUDE (:F0:NCRSEG.EXT)
  =1     $SAVE NOLIST
  =
                                          /* RQ$CREATE$SEMAPHORE   */
  =      $INCLUDE (:F0:NCRSEM.EXT)
  =1     $SAVE NOLIST
  =
                                          /* RQ$CREATE$TASK        */
  =      $INCLUDE (:F0:NCRTSK.EXT)
  =1     $SAVE NOLIST
  =
                                          /* RQ$DELETE$SEGMENT     */
  =      $INCLUDE (:F0:NDLSEG.EXT)
  =1     $SAVE NOLIST
  =
                                          /* RQ$DELETE$TASK        */
  =      $INCLUDE (:F0:NDLTSK.EXT)
  =1     $SAVE NOLIST
  =
                                          /* RQ$END$INIT$TASK      */
```

```
=    $INCLUDE (:F0:NEINIT.EXT)
=1   $SAVE NOLIST
=
=    $INCLUDE (:F0:NGTTYP.EXT)
=1   $SAVE NOLIST
=
=    $INCLUDE (:F0:NGTTOK.EXT)
=1   $SAVE NOLIST
=
=    $INCLUDE (:F0:NLUOBJ.EXT)
=1   $SAVE NOLIST
=
=    $INCLUDE (:F0:NRCCTL.EXT)
=1   $SAVE NOLIST
=
=    $INCLUDE (:F0:NRCMES.EXT)
=1   $SAVE NOLIST
=
=    $INCLUDE (:F0:NRCUNI.EXT)
=1   $SAVE NOLIST
=
=    $INCLUDE (:F0:NSNCTL.EXT)
=1   $SAVE NOLIST
=
=    $INCLUDE (:F0:NSNMES.EXT)
=1   $SAVE NOLIST
=
=    $INCLUDE (:F0:NSNUNI.EXT)
=1   $SAVE NOLIST
=
=    $INCLUDE (:F0:NSTEXH.EXT)
=1   $SAVE NOLIST
=
=    $INCLUDE (:F0:NSTINT.EXT)
=1   $SAVE NOLIST
=
=    $INCLUDE (:F0:NSGINT.EXT)
=1   $SAVE NOLIST
=
=    $INCLUDE (:F0:NEXINT.EXT)
=1   $SAVE NOLIST
=
=    $INCLUDE (:F0:NSLEEP.EXT)
=1   $SAVE NOLIST
=
=    $INCLUDE (:F0:NSUTSK.EXT)
=1   $SAVE NOLIST
=
=    $INCLUDE (:F0:NUCOBJ.EXT)
=1   $SAVE NOLIST
=
=    $INCLUDE (:F0:NWTINT.EXT)
=1   $SAVE NOLIST
     $EJECT
```

/* RQ$GET$TASK$TOKENS    */

/* RQ$GET$TYPE           */

/* RQ$LOOKUP$OBJECT      */

/* RQ$RECEIVE$CONTROL    */

/* RQ$RECEIVE$MESSAGE    */

/* RQ$RECEIVE$UNITS      */

/* RQ$SEND$CONTROL       */

/* RQ$SEND$MESSAGE       */

/* RQ$SEND$UNITS         */

/* RQ$SET$EXCEPT$HDLR    */

/* RQ$SET$INTERRUPT      */

/* RQ$SIGNAL$INTERRUPT   */

/* RQ$EXIT$INTERRUPT     */

/* RQ$SLEEP              */

/* RQ$SUSPEND$TASK       */

/* RQ$UNCATALOG$OBJECT   */

/* RQ$WAIT$INTERRUPT     */

```
            /*
            ---------
            VARIABLES
            ---------
            */
85    1     DECLARE EH$STRUC STRUCTURE (PROC$ADDR POINTER,
                                        MODE        BYTE) DATA(0E$H,3);
86    1     DECLARE (OWN$JOB$TOKEN,
                     SPEED$RGN,
                     MODEL$RGN)         TOKEN;

87    1     DECLARE (J,K,L,N,
                     STATUS,
                     UPDATE$TIME,
                     MAX$ACCUMULATOR$FILL)   WORD;

88    1     DECLARE FP$TEMPO           REAL;

89    1     DECLARE FLOAT$ACC(500)     BYTE    EXTERNAL;

90    1     DECLARE (ACCUMULATOR$LEVEL$LOW,
                     ACCUMULATOR$LEVEL$HIGH,
                     FIXED$SPEED$FLAG)       BYTE PUBLIC;

91    1     DECLARE (OLD$ACCUMULATOR$LEVEL$LOW,
                     OLD$ACCUMULATOR$LEVEL$HIGH) BYTE;
            /*
            ----------------
            GLOBAL VARIABLES
            ----------------
            */
92    1     DECLARE (FP$SECONDS$ACC,
                     FP$ACCUMULATOR$DELAY,
                     FP$TIME$RESOLUTION,
                     FP$MAX$ACCUMULATOR$FILL,
                     FP$MINIMUM$SPEED,
                     FP$MAXIMUM$SPEED)       REAL    EXTERNAL;

93    1     DECLARE (CONT$FILL$LEVEL,
                     MAX$NUMBER$ELEMENTS)    WORD    EXTERNAL;
            $EJECT
            /*
            --------------------------------
            EXTERNAL FLOATING POINT VARIABLES
            --------------------------------
            */
94    1     DECLARE (FP$DA,
                     FP$SLOPE,
                     FP$OFFSET,
                     FP$SPEED$REQUEST,
                     FP$CONT$FILL$LEVEL,
                     FP$FIXED$SPEED$REQUEST,
                     FP$DA$REQUEST)          REAL    EXTERNAL;
            $EJECT
```

```
75   1     SPDREG: PROCEDURE PUBLIC;
           /*
           ==============
           INITIALIZATION
           ==============
           */
76   2     CALL RQ$SET$EXCEPTION$HANDLER (@EH$STRUC,@STATUS); /* THIS TASK'S EXCEPTION HANDLER */

97   2     UPDATE$TIME          = UNSIGN(FIX(FP$TIME$RESOLUTION*100.));

98   2     MAX$ACCUMULATOR$FILL = UNSIGN(FIX(FP$MAX$ACCUMULATOR$FILL));

99   2     K = MAX$NUMBER$ELEMENTS;   /* TOTAL NUMBER OF ACCUMULATOR RESOLUTION ELEMENTS */
           /*
           ----------------------------------
           LOOKUP PREVIOUSLY CATALOGED OBJECTS
           ----------------------------------
           */
100  2     OWN$JOB$TOKEN = RQ$GET$TASK$TOKENS (1,@STATUS);

101  2     SPEED$RGN  = RQ$LOOKUP$OBJECT  (OWN$JOB$TOKEN,              /* SPEED REGION */
                                           @(9,'SPEED$RGN'),
                                           WAIT$INDEFINITELY,
                                           @STATUS);

102  2     MODEL$RGN  = RQ$LOOKUP$OBJECT  (OWN$JOB$TOKEN,              /* MODEL REGION */
                                           @(9,'MODEL$RGN'),
                                           WAIT$INDEFINITELY,
                                           @STATUS);
           $EJECT
           /*
           =========
           MAIN LOOP
           =========
           */
103  2     DO FOREVER;

104  3         CALL RQ$RECEIVE$CONTROL (MODEL$RGN,@STATUS);
               /*
               ---------------------------------
               ACCUMULATOR FILL LEVEL MEASUREMENT
               ---------------------------------
               */
               /* COMPUTE AMMOUNT OF ACCUMULATOR TO BE INCLUDED
                  IN CONTINUOUS FILL LEVEL */

105  3         J = MAX$NUMBER$ELEMENTS * (CONT$FILL$LEVEL/MAX$ACCUMULATOR$FILL);

106  3         IF J > K   THEN J = K;                     /* STAY WITHIN ARRAY */
108  3         IF J < 1   THEN J = 1;                     /* ENTER LOOP AT LEAST ONCE */

110  3         DO N = 0 TO J;                             /* COMPUTE NEW CONTINUOUS FILL LEVEL
111  4             CONT$FILL$LEVEL = CONT$FILL$LEVEL + FLOAT$ACC(N);
112  4             FLOAT$ACC(N) = 0;
113  4         END;
```

```
114   3       DO N = 1 TO K-1;                              /* MOVE ALL PARTS DOWN THE ACCUMULATOR */
115   4           FLOAT$ACC(N)    = FLOAT$ACC(N+1);
116   4       END;

117   3       FLOAT$ACC(K)        = 0;                      /* ENTRY POINT PARTS WERE ALL MOVED
                                                               TO FLOAT$ACC(K-1) */
       $EJECT
       /*
       ------------------------------------------------------------
       VERIFY THE CONTINUOUS FILL LEVEL CALCULATION AGAINST THE ACCUMULATOR
       HIGH OR LOW LEVEL SENSORS.

MAKE THE COMPARISON AND ADJUST THE CALCULATED VALUE IF IT IS OUT OF
       TOLERANCE. THE SPEED CONTROL ALGORITHM IS ALLOWED TO FUNCTION BETWEEN
       THE HIGH AND LOW LEVEL SENSORS.
       ------------------------------------------------------------
       */
118   3       ACCUMULATOR$LEVEL$LOW   = INPUT(0CCH) AND 00000001B;   /* LOW LEVEL SENSOR STATUS */
119   3       ACCUMULATOR$LEVEL$HIGH  = INPUT(0CCH) AND 00000010B;   /* HIGH LEVEL SENSOR STATUS */

/* ---------- EDGE TRANSITION ON HIGH LEVEL SENSOR -------------- */

120   3       IF (OLD$ACCUMULATOR$LEVEL$HIGH XOR ACCUMULATOR$LEVEL$HIGH) AND
                  (CONT$FILL$LEVEL < (MAX$ACCUMULATOR$FILL - 20)              OR
                   CONT$FILL$LEVEL > (MAX$ACCUMULATOR$FILL + 20))             THEN
121   3           CONT$FILL$LEVEL = MAX$ACCUMULATOR$FILL;

/* ----------    CHECK UPPER ACCUMULATOR FILL LIMIT   -------------- */

122   3       IF (ACCUMULATOR$LEVEL$LOW AND ACCUMULATOR$LEVEL$HIGH)         AND
                  (CONT$FILL$LEVEL < (MAX$ACCUMULATOR$FILL - 20)              OR
                   CONT$FILL$LEVEL > (MAX$ACCUMULATOR$FILL + 20))             THEN
123   3           CONT$FILL$LEVEL = MAX$ACCUMULATOR$FILL;

/* ----------       CHECK FOR OUT OF PARTS!       -------------- */

124   3       IF NOT ACCUMULATOR$LEVEL$LOW    THEN
125   3           DO;
126   4               CONT$FILL$LEVEL = 0;
127   4           END;
       /*
       ------------------------------------------------------------
       UPDATE THE OLD ACCUMULATOR LEVEL SENSOR
       INFORMATION
       ------------------------------------------------------------
       */
128   3       OLD$ACCUMULATOR$LEVEL$LOW       = ACCUMULATOR$LEVEL$LOW;
129   3       OLD$ACCUMULATOR$LEVEL$HIGH      = ACCUMULATOR$LEVEL$HIGH;
       $EJECT
       /*
       ------------------------------------------------------------
       CALCULATE MACHINE SPEED BASED ON THE CONTINUOUS
       ACCUMULATOR FILL CALCULATION.
       (START AND STOP THE MACHINE BASED ON THE ACCUMULATOR LOW LEVEL SENSOR
       ------------------------------------------------------------
       */
```

```
130   3      FP$TEMPO              = FLOAT(INT(CONT$FILL$LEVEL));
131   3      CALL RQ$SEND$CONTROL (@STATUS);      /* RELINQUISH CONTROL OF MODEL$RGN */

132   3      CALL RQ$RECEIVE$CONTROL (SPEED$RGN,@STATUS);

133   3      FP$CONT$FILL$LEVEL    = FP$TEMPO;

134   3      IF ACCUMULATOR$LEVEL$LOW   THEN
135   3         DO;                              /* LOW LEVEL SENSOR COVERED */
136   4         FP$SPEED$REQUEST = (FP$CONT$FILL$LEVEL*60.0)/FP$SECONDS$ACC;
               /* FP$SECONDS$ACC SECONDS ACCUMULATION */

137   4         IF FP$SPEED$REQUEST < FP$MINIMUM$SPEED THEN
138   4             FP$SPEED$REQUEST = 0.0;
139   4         ELSE IF FP$SPEED$REQUEST > FP$MAXIMUM$SPEED THEN
140   4             FP$SPEED$REQUEST = FP$MAXIMUM$SPEED;
141   4         END;
142   3      ELSE                                /* LOW LEVEL SENSOR NOT COVERED */
                FP$SPEED$REQUEST = 0.;
             /*
             ------------------------------
             COMPUTE THE D/A OUTPUT VALUE
             ------------------------------
             */
143   3      FP$DA = (FP$SPEED$REQUEST*FP$SLOPE) + FP$OFFSET;

144   3      IF FP$DA < 0.      THEN FP$DA = 0.;
146   3      IF FP$DA > 4095.   THEN FP$DA = 4095.;

148   3      CALL RQ$SEND$CONTROL (@STATUS);    /* RELINQUISH CONTROL OF SPEED$RGN */

149   3      CALL RQ$SLEEP (UPDATE$TIME,@STATUS);       /* RUN ACCORDING TO THE
                                                          TIME RESOLUTION SELECTED */
150   3      END;
151   2   END SPDREG;
152   1   END;

MODULE INFORMATION:

CODE AREA SIZE    = 02F0H     752D
    CONSTANT AREA SIZE = 005DH     93D
    VARIABLE AREA SIZE = 001DH     29D
    MAXIMUM STACK SIZE = 0014H     20D
    760 LINES READ
    0 PROGRAM WARNINGS
    0 PROGRAM ERRORS

DICTIONARY SUMMARY:
    667KB MEMORY AVAILABLE
    10KB MEMORY USED   (1%)
    0KB DISK SPACE USED

END OF PL/M-86 COMPILATION
```

```
SERIES-II/PL/M-86 V2.3 COMPILATION OF MODULE ALGOUT
OBJECT MODULE PLACED IN :F4:ALGOUT.OBJ
COMPILER INVOKED BY:  PLM86.86 :F4:ALGOUT.P86

$DEBUG ROM LARGE
        $OPTIMIZE(3)
        $TITLE('ANALOG OUTPUT')
        /*
        ==================================================
            MODULE ANALOG OUTPUT - DIGITAL TO ANALOG CONVERSION
                                FOR MACHINE CONTROL

COPYRIGHT ADOLPH COORS CO.
                      GOLDEN, COLORADO 80401
                      OCTOBER 3, 1984
        ==================================================
        */
   1    ALGOUT: DO;
        /*
        ******************************************************************
        *PRIORITY 132
        *RECEIVES: MESSAGE----------FROM----------VIA----------COMMENTS
        *          NONE
        *
        *SENDS:    MESSAGE----------TO------------VIA----------COMMENTS
        *          NONE
        *
        *USES PUBLIC PROCEDURES:
        *READS PUBLIC DATA: FP$DA
        *WRITES PUBLIC DATA:
        *
        *FUNCTION: TO OUTPUT THE FP$DA VALUE (DIGITAL/ANALOG SPEED VALUE) VIA THE
        *          ISBX 328 BOARD. THIS TASK RUNS EVERY 90 MSEC UPDATING THE D/A
        *          OUTPUT.
        *
        *OPERATION: INITIALIZATION
        *          1) OBTAIN THE TOKEN FOR THE SPEED REGION.
        *
        *          2) INITIALIZE THE ISBX 328 BOARD WHEN IT IS READY.
        *
        *          MAIN LOOP
        *          1) GET THE LATEST FP$DA VALUE AND CONVERT TO A WORD VALUE.
        *
        *          2) ADD THE CHANNEL ADDRESS INFORMATION.
        *
        *          3) OUTPUT THE LOWER AND UPPER BYTES.
        *
        *          NOTE: THE ISBX 328 BOARD HAS NO PROVISIONS FOR A HARDWARE
        *          INTERRUPT TO THE CPU WHEN IT IS READY FOR ANOTHER BYTE. THE
        *          INTERMEDIATE CALLS TO RQSLEEP GUARANTEE AGAINST TYING UP THE
        *          SYSTEM IF THE BOARD DOES NOT RESPOND PROPERLY TO THE STATUS
        *          REQUEST (INPUT).
        ******************************************************************
        */
        $EJECT
```

```
/*

***********************REVISION INSTRUCTIONS***********************

WHEN REVISING THIS MODULE PLEASE ADD THE FOLLOWING
INFORMATION TO THIS FILE IN ADDITION TO REVISING
THE MASTER REVISION LIST (MSTREV.TXT).

1.  DATE OF REVISION AND REVISION LETTER.
    2.  A FULL DESCRIPTION OF THE REVISION.
    3.  A LIST OF OTHER MODULES AFFECTED AS A
        DIRECT RESULT OF THIS REVISION.

WITHIN THIS FILE INCLUDE THE REVISION LETTER AT THE
END OF EACH LINE ADDED OR MODIFIED AND IMMEDIATELY
PRIOR TO THE LOCATION FROM WHICH A LINE WAS REMOVED.

********************** REVISION STATUS **********************

ORIGINAL PROGRAM DATE 10/3/84
            PROGRAM AUTHOR - ROGER THOMPSON

OTHER
                        MODULES
    REVISION    DATE    AFFECTED    ENGINEER    DESCRIPTION
    --------    ----    --------    --------    -----------

*/
$EJECT
/*
============
DECLARATIONS
============
*/
$INCLUDE (:F4:SYSIO.LIT)
    =   /**=====================================**/
    =   /**   SYSIO.LIT - SYSTEM I/O DECLARATIONS**/
    =   /**=====================================**/
=   /*
=   ====================================
=   I/O PORT DECLARATIONS FOR ISBC 86/30
=   ====================================
=   ------------------------
=   PARALLEL PORT (8255 #0)
=   ------------------------
=   */
2  1 =  DECLARE PPI#0$PORT1 LITERALLY '0C8H';      /* PPI #0 PORT A */
```

```
3   1  =   DECLARE PPI$0$PORT2 LITERALLY '0CAH';      /* PPI #0 PORT B */
4   1  =   DECLARE PPI$0$PORT3 LITERALLY '0CCH';      /* PPI #0 PORT C */
5   1  =   DECLARE PPI$0$CONT  LITERALLY '0CEH';      /* PPI #0 PORT CONTROL */
       =   /*
       =   --------------------
       =   MULTIMODULE J4
       =   iSBX 328 ANALOG I/O
       =   (8-BIT ADDRESSING)
       =   --------------------
       =   */
6   1  =   DECLARE WRITE$328       LITERALLY '80H',
       =           READ$328        LITERALLY '82H',
       =           RESET$328       LITERALLY '82H';
           $EJECT
       =   $INCLUDE (:F4:COMMON.LIT)
       =   /*
       =   ================
       =     COMMON.LIT
       =   ================
       =   */
       =   /* THESE ARE DECLARATIONS THAT WILL BE COMMON TO ALL PROGRAMS */

7   1  =   DECLARE TOKEN              LITERALLY 'SELECTOR',
       =           WAIT$INDEFINITELY  LITERALLY '0FFFFH',
       =           FOREVER            LITERALLY 'WHILE 1',
       =           FIFO               LITERALLY '0',
       =           FIFO$8             LITERALLY '4',
       =           PRIORITY$QUEUE     LITERALLY '1';

8   1  =   DECLARE TRUE       LITERALLY '0FFH',
       =           FALSE      LITERALLY '0',
       =           ON         LITERALLY '1',
       =           OFF        LITERALLY '0',
       =           AUTO       LITERALLY '0',
       =           COVERED    LITERALLY '1',
       =           CLEAR      LITERALLY '0',
       =           RUN        LITERALLY '1',
       =           STOP       LITERALLY '0',
       =           DOWN       LITERALLY '0',
       =           UP         LITERALLY '1',
       =           JOG        LITERALLY '0',
       =           FULL       LITERALLY '1',
       =           NOT$FULL   LITERALLY '0',
       =           ENABLED    LITERALLY '1',
       =           DISABLED   LITERALLY '0';
           $EJECT
           $INCLUDE (:F4:RMXMOS.EXT)
       =                                           /* RQ$CATALOG$OBJECT  */
       =   $INCLUDE (:F0:NCTOBJ.EXT)
       =1  $SAVE NOLIST
       =                                           /* RQ$CREATE$MAILBOX  */
       =   $INCLUDE (:F0:NCRMBX.EXT)
       =1  $SAVE NOLIST
       =                                           /* RQ$CREATE$REGION  */
       =   $INCLUDE (:F0:NCRREG.EXT)
       =1  $SAVE NOLIST
```

```
=       $INCLUDE (:F0:NCRSEG.EXT)               /* RQ$CREATE$SEGMENT     */
=1      $SAVE NOLIST
=                                               /* RQ$CREATE$SEMAPHORE   */
=       $INCLUDE (:F0:NCRSEM.EXT)
=1      $SAVE NOLIST
=                                               /* RQ$CREATE$TASK        */
=       $INCLUDE (:F0:NCRTSK.EXT)
=1      $SAVE NOLIST
=                                               /* RQ$DELETE$SEGMENT     */
=       $INCLUDE (:F0:NDLSEG.EXT)
=1      $SAVE NOLIST
=                                               /* RQ$DELETE$TASK        */
=       $INCLUDE (:F0:NDLTSK.EXT)
=1      $SAVE NOLIST
=                                               /* RQ$END$INIT$TASK      */
=       $INCLUDE (:F0:NEINIT.EXT)
=1      $SAVE NOLIST
=                                               /* RQ$GET$TASK$TOKENS    */
=       $INCLUDE (:F0:NGTTYP.EXT)
=1      $SAVE NOLIST
=                                               /* RQ$GET$TYPE           */
=       $INCLUDE (:F0:NGTTOK.EXT)
=1      $SAVE NOLIST
=                                               /* RQ$LOOKUP$OBJECT      */
=       $INCLUDE (:F0:NLUOBJ.EXT)
=1      $SAVE NOLIST
=                                               /* RQ$RECEIVE$CONTROL    */
=       $INCLUDE (:F0:NRCCTL.EXT)
=1      $SAVE NOLIST
=                                               /* RQ$RECEIVE$MESSAGE    */
=       $INCLUDE (:F0:NRCMES.EXT)
=1      $SAVE NOLIST
=                                               /* RQ$RECEIVE$UNITS      */
=       $INCLUDE (:F0:NRCUNI.EXT)
=1      $SAVE NOLIST
=                                               /* RQ$SEND$CONTROL       */
=       $INCLUDE (:F0:NSNCTL.EXT)
=1      $SAVE NOLIST
=                                               /* RQ$SEND$MESSAGE       */
=       $INCLUDE (:F0:NSNMES.EXT)
=1      $SAVE NOLIST
=                                               /* RQ$SEND$UNITS         */
=       $INCLUDE (:F0:NSNUNI.EXT)
=1      $SAVE NOLIST
=                                               /* RQ$SET$EXCEPT$HDLR    */
=       $INCLUDE (:F0:NSTEXH.EXT)
=1      $SAVE NOLIST
=                                               /* RQ$SET$INTERRUPT      */
=       $INCLUDE (:F0:NSTINT.EXT)
=1      $SAVE NOLIST
=                                               /* RQ$SIGNAL$INTERRUPT   */
=       $INCLUDE (:F0:NSGINT.EXT)
=1      $SAVE NOLIST
=                                               /* RQ$EXIT$INTERRUPT     */
=       $INCLUDE (:F0:NEXINT.EXT)
```

```
    =1  $SAVE NOLIST
    =                                       /* RQ$SLEEP              */
    =   $INCLUDE (:F0:NSLEEP.EXT)
    =1  $SAVE NOLIST
    =                                       /* RQ$SUSPEND$TASK        */
    =   $INCLUDE (:F0:NSUTSK.EXT)
    =1  $SAVE NOLIST
    =                                       /* RQ$UNCATALOG$OBJECT    */
    =   $INCLUDE (:F0:NUCOBJ.EXT)
    =1  $SAVE NOLIST
    =                                       /* RQ$WAIT$INTERRUPT      */
    =   $INCLUDE (:F0:NWTINT.EXT)
    =1  $SAVE NOLIST
        $EJECT
        /*
        --------------------
        EXTERNAL PROCEDURES
        --------------------
        */
86  1   E$H: PROCEDURE (C$CODE,PARAM,R1,R2) EXTERNAL;
87  2       DECLARE (C$CODE,R1,R2) WORD;
88  2       DECLARE PARAM BYTE;
89  2   END E$H;
        /*
        --------
        LITERALS
        --------
        */
90  1   DECLARE INIT$RDY$MASK    LITERALLY '00000100B',
                IN$BUF$FUL$MASK  LITERALLY '00000010B',
                CHANNEL$0        LITERALLY '00000000B'; /* CHANNEL 0 IS 4-20 MA */
        /*
        ---------
        VARIABLES
        ---------
        */
91  1   DECLARE EH$STRUC STRUCTURE (PROC$ADDR POINTER,
                                    MODE      BYTE) DATA(E$H,3);

92  1   DECLARE (OWN$JOB$TOKEN,
                SPEED$RQN)       TOKEN;

93  1   DECLARE (OUTVAL,
                STATUS)          WORD;

94  1   DECLARE FP$TEMPO         REAL;

95  1   DECLARE DA$OUT           WORD;

96  1   DECLARE FP$DA            REAL EXTERNAL;

$EJECT
97  1   ALGOUT: PROCEDURE PUBLIC;

/*
```

```
          ================
          INITIALIZATION
          ================
          */
          /*
          --------------------------------------
          LOOKUP PREVIOUSLY CATELOGED OBJECTS
          --------------------------------------
          */
 72  2    OWN$JOB$TOKEN = RQ$GET$TASK$TOKENS (1,@STATUS);

79  2    SPEED$RGN   = RQ$LOOKUP$OBJECT (OWN$JOB$TOKEN,          /* SPEED REGION */
                                          @(9,'SPEED$RGN'),
                                          WAIT$INDEFINITELY,
                                          @STATUS);
          /*
          ---------------
          INITIALIZE UPI
          ---------------
          */
100  2    OUTPUT(RESET$32B) = 0;                        /* RESET UPI            */

101  2    DO WHILE (INPUT(READ$32B) AND INIT$RDY$MASK) = 0;  /* TEST - READY FOR INIT? */
102  3        CALL RQ$SLEEP (1,@STATUS);
103  3    END;
104  2    OUTPUT(WRITE$32B) = 00000000B;                /* WRITE INITIALIZATION BYTE */

$EJECT
          /*
          =========
          MAIN LOOP
          =========
          */
105  2        DO FOREVER;
106  3            CALL RQ$RECEIVE$CONTROL (SPEED$RGN,@STATUS);
107  3            FP$TEMPO = FP$DA;             /* TRANSFER DATA TO LOCAL BUFFER */
108  3            CALL RQ$SEND$CONTROL (@STATUS);

109  3            DA$OUT = UNSIGN(FIX(FP$TEMPO));

110  3            OUTVAL = SHL(DA$OUT,4);       /* SHIFT VALUE TO UPPER 12 BITS */
111  3            OUTVAL = OUTVAL OR CHANNEL$0; /* PLACE CHANNEL ADDRESS IN LOWER 4 BITS */

112  3            DO WHILE (INPUT(READ$32B) AND IN$BUF$FUL$MASK) <> 0;  /* READY FOR NEXT BYTE? */
113  4                CALL RQ$SLEEP (1,@STATUS);
114  4            END;
115  3            OUTPUT(WRITE$32B) = LOW(OUTVAL);

116  3            DO WHILE (INPUT(READ$32B) AND IN$BUF$FUL$MASK) <> 0;  /* READY FOR NEXT BYTE? */
117  4                CALL RQ$SLEEP (1,@STATUS);
118  4            END;
119  3            OUTPUT(WRITE$32B) = HIGH(OUTVAL);

120  3            CALL RQ$SLEEP(9,@STATUS);    /* RUN EVERY 90-100 MSEC */
```

What is claimed is:

1. A continuous processing system for performing production operations on a plurality of unit products using at least two discrete processing machines comprising:
   (a) an upstream processing machine means for performing a first operation on unit products passing therethrough, said upstream machine means having a product inlet and a product outlet;
   (b) a downstream processing machine means for performing a second operation on unit products passing therethrough, said downstream machine having a product inlet and a product outlet;
   (c) accumulator means for transferring said plurality of unit products between said upstream machine means and said downstream machine means and for accumulating unit products in tightly packed continuously touching relationship in a variable length area starting at a position adjacent said downstream machine product inlet and extending toward said upstream machine product outlet; the number of unit products in said tightly packed continuously touching reltaionship adjacent said downstream machine product inlet defining a continuous-fill-accumulation;
   (d) count-in sensor means for sensing each unit product entering said accumulator means from said upstream machine product outlet and for generating a count-in sensor signal in response thereto;
   (e) count-out sensor means for sensing each unit product exiting from said accumulator means to said downstream machine product inlet and for generating a count-out sensor signal in response thereto;
   (f) accumulator modeling means for receiving said count-in and said count-out sensor signals and for continuously predicting said continuous-fill-accumulation;
   (g) machine speed control means for continuously variably controlling the speed of at least one of said upstream machine and said downstream machine based on said predicted continuous-fill-accumulation for maintaining said downstream machine speed sufficiently low relative said upstream machine speed to continuously provide a sufficiently large continuous-fill-accumulation to enable an uninterrupted flow of unit products to said downstream machine, and for maintaining said downstream machine speed sufficiently high relative said upstream machine speed to continuously prevent excessive accumulation of unit products in said accumulation means.

2. The invention of claim 1 further comprising data correction means for correcting said continuous-fill-accumulator modeling means comprising:
   low level sensor means for sensing a continuous-fill-accumulation in said accumulator means of a predetermined low value and for providing a signal in response thereto to said accumulator modeling means; and
   high level sensor means for sensing a continuous-fill-accumulation in said accumulator means of a predetermined high value and for providing a signal in response thereto to said accumulator modeling means.

3. The invention of claim 2 further comprising: accumulator speed indicating means for continuously providing a speed input to said accumulator modeling means indicative of the speed of products passing through said accumulator means prior to entering into said area of tightly packed continuously touching contact.

4. The invention of claim 3 wherein said accumulator means comprises motor driven conveyor means and wherein said accumulator speed indicating means comprises means for providing a signal indicative of conveyor speed.

5. The invention of claim 3 wherein said accumulator means comprises free fall track means for gravitational transfer of unit products therethrough and wherein said accumulator speed indicating means comprises a data input of constant value based on the average free fall velocity of a unit product passing unimpededly through said free fall track means.

6. The invention of claim 1 further comprising: accumulator speed indicating means for continuously providing a speed input to said accumulator modeling means indicative of the speed of products passing through said accumulator means prior to entering into said area of tightly packed continuously touching contact.

7. The invention of claim 1 wherein said accumulator modeling means comprises:
floating accumulation data array means having a predetermined number of serially arranged data storage elements for temporarily storing data values therein, said data storage elements each corresponding to a physical portion of the length of said accumulator means and including a first element corresponding to a physical portion of said accumulator means position adjacent said downstream machine means and including a last element corresponding to a physical portion of said accumulator means positioned adjacent said upstream machine;
continuous-fill data storage means for temporarily storing a data value predictive of said continuous-fill-accumulation of said accumulator means;
count-in input means for detecting said count-in sensor signal and in response thereto incrementing said last element of said floating accumulation data array means;
count-out input means for detecting said count-out signal and in response thereto decrementing said continuous-fill data storage means when the value thereof is greater than zero;
data shifting means for, at periodic update intervals, shifting the data in every data element of said floating-accumulation data array to the next preceding element thereof and for summing and transferring the data values in a selected, variable length, continuous, subarray portion of said floating-accumulation data array means to said continuous-fill data storage means; the number of said selected continuous, subarray being proportional to the value stored in said continuous-fill accumulated data storage means and said selected continuous subarray consisting of said first data array element and a selected number of elements serially succeeding said first element.

8. The invention of claim 7 further comprising:
accumulator speed indicating means for providing a speed value input to said accumulator modeling means indicative of the speed of products passing unimpededly through said accumulator means;
wherein said data shifting means frequency of operation is dependent upon said speed value input.

9. The invention of claim 8:
wherein said accumulator means comprises motor driven conveyor means;
wherein said accumulator speed indicating means comprises a signal indicative of conveyor speed;
wherein said speed value input comprises said signal indicative of conveyor speed.

10. The invention of claim 8:
wherein said accumulator means comprises free fall track means for gravitational transfer of unit products therethrough; and
wherein said speed value input comprises a constant data value based on the average velocity of a unit product passing through said free fall track means.

11. The invention of claim 8 further comprising:
low level sensor means for sensing a continuous-fill-accumulation of a predetermined low value and for providing a signal in response thereto to said accumulator modeling means; and
high level sensor means for sensing a continuous-fill-accumulation of a predetermined high value and for providing a signal in response thereto to said accumulator modeling means.

12. The invention of claim 11 further comprising:
low level input means for detecting said signal from said low level sensor means and for correcting data values in said data array means in response to said signal from said low level sensor means;
high level input means for detecting said signal from said high level sensor means and for correcting data values in said data array means in response to said signal from said high level sensor means.

13. The invention of claim 12:
wherein said accumulator means comprises a free fall accumulator; and
wherein the number of elements in said data array means is equal to the total time required for a part to move unimpededly from a position opposite said high level sensor means to a position opposite said low level sensor means divided by the periodic frequency of operation of said data shifting means.

14. The invention of claim 12:
wherein said accumulator means comprises a variable speed conveyor; and
wherein the number of elements in said data array means is equal to the physical length of said accumulator means between said low and high level sensor means multiplied by a constant equal to the number of pulses per unit length of movement of said conveyor which are generated by a conveyor speed indicating means providing said speed value input to said accumulator modeling means.

15. A method of measuring product inventory in a loosely coupled mechanical system of the type having an upstream processing machine and a downstream processing machine operable at variably different speeds and connected to an entrance and exit portion of a product accumulator which transfers unit products from the upstream machine to the downstream machine and which has a variable length floating accumulation area beginning at the accumulator entrance where product speed is dependent only on the conveyor characteristics, and a variable length continuous accumulation area, extending from the floating accumulation area to the accumulator exit where products are packed in continuous touching contact and where product speed is dependent on the downstream machine operating speed, comprising the steps of:
(a) providing a floating accumulation data array having a predetermined number of serially arranged data storage elements corresponding to physical portions of the accumulator;
(b) providing a continuous-fill-accumulation data storage element for storing a value corresponding to the number of unit products currently in the continuous accumulation area of the accumulator;

(c) detecting each unit product as it enters the accumulator and incrementing a data element of the floating accumulation data array which corresponds to the entrance of the accumulator in response to each detected entering product;

(d) periodically serially shifting data through the elements of the data array in a direction corresponding to the direction of physical product movement through the accumulator;

(e) periodically transferring data from a number of serially adjacent elements of the data array, which are selected based on the current value stored in the continuous-fill-accumulation data storage element, to the continuous-fill-accumulation data storage element to provide a new continuous-fill-accumulation value;

(f) detecting each unit product as it exits the accumulator and decrementing the continuous-fill-accumulation element in response thereto.

16. The method of claim 15 comprising the further steps of:
(a) periodically generating a machine speed controlling signal based on the value stored in the continuous-fill-accumulation element; and
(b) controlling the speed of at least one of the upstream machine and downstream machine with the machine speed controlling signal.

17. The invention of claim 15 comprising the step of:
determining the period for shifting data through the data array and for transferring data from the data array based on the speed of a product movement through the accumulator.

18. A continuous processing system for performing production operations on a plurality of unit products comprising:

(a) a downstream processing machine means for performing an operation on unit products passing therethrough, said downstream machine having a product inlet and a product outlet;

(b) accumulator means having a product inlet and having a product outlet connected to said downstream machine product inlet for receiving and transferring said plurality of unit products to said downstream machine means and for accumulating unit products in tightly packed continuously touching relationship in a variable length area starting at a position adjacent said downstream machine product inlet; the number of unit products in said tightly packed continuously touching relationship adjacent said downstream machine product inlet defining a continuous-fill-accumulation;

(c) count-in sensor means for sensing each unit product entering said accumulator means product inlet and for generating a count-in sensor signal in response thereto;

(d) count-out sensor means for sensing each unit product exiting from said accumulator means product outlet to said downstream machine product inlet and for generating a count-out sensor signal in response thereto;

(e) accumulator modeling means for receiving said count-in and said count-out sensor signals and for continuously predicting said continuous-fill-accumulation;

(f) machine speed control means for continuously variably controlling the speed of said downstream machine based on said predicted continuous-fill-accumulation for maintaining said downstream machine speed sufficiently low relative the rate of unit products entering said accumulator means to continuously provide a sufficiently large continuous-fill-accumulation to enable an uninterrupted flow of unit products to said downstream machine, and for maintaining said downstream machine speed sufficiently high relative the rate of unit products entering said accumulator means to continuously prevent excessive accumulation of unit products in said accumulation means.

19. The invention of claim 18 further comprising data correction means for correcting said continuous-fill-accumulator modeling means comprising:
low level sensor means for sensing a continuous-fill-accumulation in said accumulator means of a predetermined low value and for providing a signal in response thereto to said accumulator modeling means; and
high level sensor means for sensing a continuous-fill-accumulation in said accumulator means of a predetermined high value and for providing a signal in response thereto to said accumulator modeling means.

20. The invention of claim 18 further comprising:
accumulator speed indicating means for continuously providing a speed input to said accumulator modeling means indicative of the speed of products passing through said accumulator means prior to entering into said area of tightly packed continuously touching contact.

21. The invention of claim 18 wherein said accumulator modeling means comprises:
floating accumulation data array means having a predetermined number of serially arranged data storage elements for temporarily storing data values therein, said data storage elements each corresponding to a physical portion of the length of said accumulator means and including a first element corresponding to a physical portion of said accumulator means positioned at said accumulator outlet and including a last element corresponding to a physical portion of said accumulator means positioned at said accumulator inlet;
continuous-fill data storage means for temporarily storing a data value predictive of said continuous-fill-accumulation of said accumulator means;
count-in input means for detecting said count-in sensor signal and in response thereto incrementing said last element of said floating accumulation data array means;
count-out input means for detecting said count-out signal and in response thereto decrementing said continuous-fill data storage means when the value thereof is greater than zero;
data shifting means for, at periodic update intervals, shifting the data in every data element of said floating-accumulation data array to the next preceding element thereof and for summing and transferring the data values in a selected, variable length, continuous, subarray portion of said floating-accumulation data array means to said continuous-fill data storage means; the number of said selected continuous, subarray being proportional to the value stored in said continuous-fill accumulated data storage means and said selected continuous subarray consisting of said first data array element and a selected number of elements serially succeeding said first element.

22. The invention of claim 21 further comprising:
accumulator speed indicating means for providing a speed value input to said accumulator modeling means indicative of the speed of products passing unimpededly through said accumulator means;
wherein said data shifting means frequency of operation is dependent upon said speed value input.

23. The invention of claim 22:
wherein said accumulator means comprises motor driven conveyor means;
wherein said accumulator speed indicating means comprises a signal indicative of conveyor speed;
wherein said speed value input comprises said signal indicative of conveyor speed.

24. The invention of claim 22:
wherein said accumulator means comprises free fall track means for gravitational transfer of unit products therethrough; and
wherein said speed value input comprises a constant data value based on the average velocity of a unit product passing through said free fall track means.

* * * * *